United States Patent
Ono

(10) Patent No.: US 8,605,197 B2
(45) Date of Patent: Dec. 10, 2013

(54) IMAGING APPARATUS

(71) Applicant: FUJIFILM Corporation, Tokyo (JP)

(72) Inventor: Shuji Ono, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/851,599

(22) Filed: Mar. 27, 2013

(65) Prior Publication Data

US 2013/0222676 A1    Aug. 29, 2013

Related U.S. Application Data

(63) Continuation of application No. PCT/JP2011/070796, filed on Sep. 13, 2011.

(30) Foreign Application Priority Data

Oct. 1, 2010  (JP) .................................. 2010-224234
May 24, 2011  (JP) .................................. 2011-116180
Aug. 11, 2011  (JP) .................................. 2011-176229

(51) Int. Cl.
*H04N 5/225*   (2006.01)
*G03B 13/00*   (2006.01)
*H04N 5/235*   (2006.01)

(52) U.S. Cl.
USPC .......................... 348/340; 348/345; 348/222.1

(58) Field of Classification Search
USPC ......................................... 348/343, 345, 340
See application file for complete search history.

(56) References Cited

U.S. PATENT DOCUMENTS 6,449,081 B1   9/2002 Onuki et al.

2009/0059057 A1* 3/2009 Long et al. ................... 348/343
2011/0085050 A1* 4/2011 Dowski et al. ............. 348/222.1
2012/0327222 A1* 12/2012 Ng et al. ...................... 348/135

FOREIGN PATENT DOCUMENTS

| JP | 08-329549 | 12/1996 |
|---|---|---|
| JP | 2000-356751 | 12/2000 |
| JP | 2003-270526 | 9/2003 |

(Continued)

OTHER PUBLICATIONS

Takashi Yahagi et al.; Restoration of Blurred Images Using Two-Dimensional Digital Filters with Noise Suppression, Institute of Electronics and Communication Engineers Academic Journal, Nov. 1984, vol. J67-D No. 10.

(Continued)

*Primary Examiner* — James M Hannett
*Assistant Examiner* — Padma Haliyur
(74) *Attorney, Agent, or Firm* — Young & Thompson

(57) ABSTRACT

An imaging apparatus, including: an image formation lens having focal lengths different in every region; a light receiving section having light receiving elements; optical elements corresponding to a plurality of the light receiving elements to make the corresponding light receiving elements receive an object light beam that passed through predetermined pupil regions in an exit pupil of the image formation lens; and an image generation section, wherein in the case of selecting, for generation of the image of the object, any one of the pupil regions in the exit pupil through which an object light beam passes, the image generation section selects, based on an object distance and focal lengths each corresponding to a plurality of the pupil regions of the exit pupil, at least one of the pupil regions through which an object light beam that forms an image at a position of the light receiving section passes.

18 Claims, 25 Drawing Sheets

(56) References Cited

FOREIGN PATENT DOCUMENTS

| JP | 2005-164983 | 6/2005 |
| JP | 3753201 | 3/2006 |
| JP | 2007-193020 | 8/2007 |
| JP | 2011-124712 | 6/2011 |
| WO | WO 2009/070213 | 6/2009 |

OTHER PUBLICATIONS

"O plus E" separate volume, Nov. 1986.

* cited by examiner

B

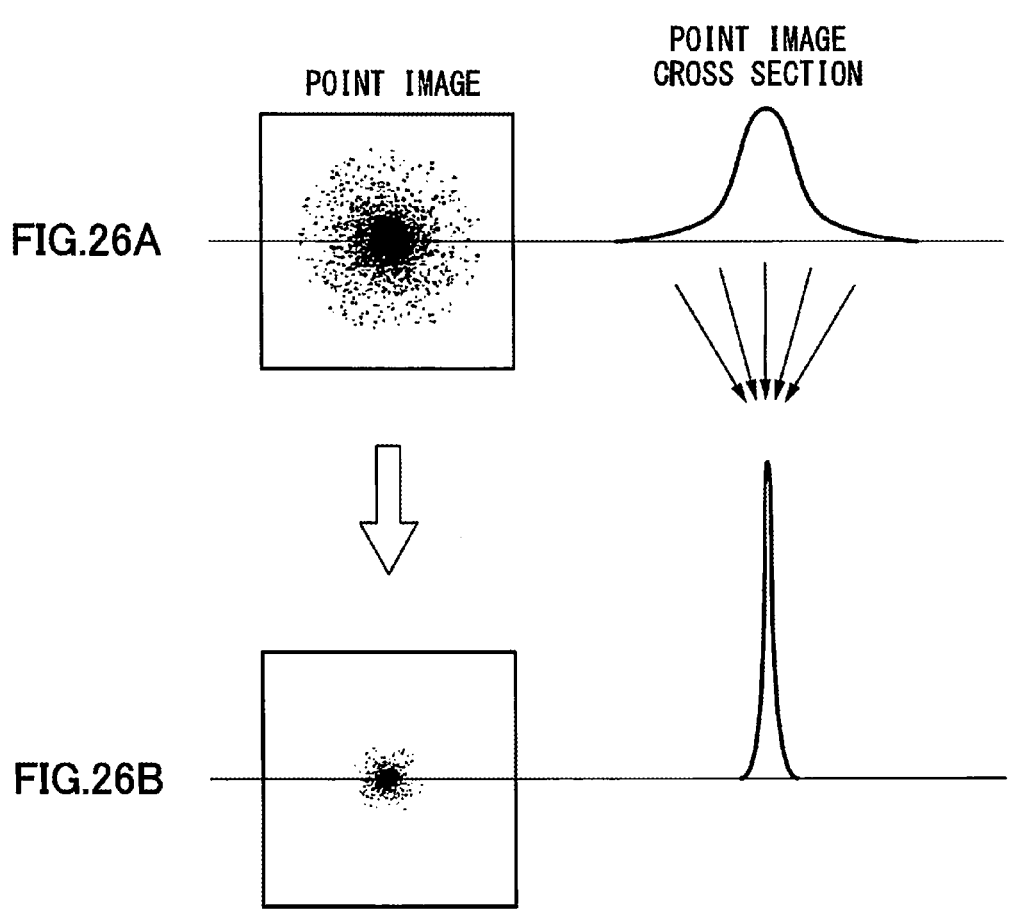

IMAGING APPARATUS

CROSS-REFERENCE TO RELATED APPLICATIONS

This application is a continuation application and claims the priority benefit under 35 U.S.C. §120 of PCT Application No. PCT/JP2011/070796 filed on Sep. 13, 2011 which application designates the U.S., and also claims the priority benefit under 35 U.S.C. §119 of Japanese Patent Applications No. 2010-224234 filed on Oct. 1, 2010, No. 2011-116180 filed on May 24, 2011, and No. 2011-176229 filed on Aug. 11, 2011, which applications are all hereby incorporated by reference in their entireties.

TECHNICAL FIELD

The present invention relates to an imaging apparatus and more particularly relates to a technology for simultaneously acquiring images with different focal lengths.

BACKGROUND ART

Regarding an optical element provided in the vicinity of an image sensor, there are known, for example, technologies disclosed in PTL 1 and PTL 2.

PTL 1 discloses a parallax image input apparatus adapted to selectively image information that passed through different positions in an image formation means that forms images of an outside, to convert the image information to image data strings, and to store the converted image data strings. According to the technology of PTL 1, a plurality of images from different viewpoints can be captured.

PTL 2 discloses a digital camera adapted to deflect incident luminous flux into two directions by a deflection means, to detect two images by the luminous flux with image sensors, to calculate, based on an image shift amount obtained from detected image positions, a focus adjustment state of an object image adjusted by an imaging lens, and to move the imaging lens to a focus position. According to the technology of PTL 2, focus adjustment may quickly be carried out by one image detecting operation.

However, in the technology of PTL 1, a pupil is spatially divided by microlenses and light receiving cells for the luminous flux incident into a general image formation lens, and only a single focus is present. Therefore, a focus adjustment mechanism is needed in order to acquire images with different focal lengths. The focus adjustment mechanism is also needed in the case of PTL 2.

If the focus adjustment mechanism is incorporated in the imaging lens in order to take images with different focal lengths, a problem of upsizing of a drive unit arises.

As a solution to the problem, PTL 3 discloses an imaging optical system, in which one or two lens surfaces in an imaging lens system have a difference in curvature between in an inner region and in an outer region that are coaxial with an optical axis, and which satisfies $0.3 \leq f2/f1 \leq 0.9$ wherein f1 represents a focal length of the entire system with the curvature of the outer region and f2 represents a focal length of the entire system with the curvature of the inner region.

Moreover, PTL 4 discloses a technology for switching, with use of fluid prisms, the focus of a multifocal lens which has two lens regions different in focal length.

According to the technologies in PTL 3 and PTL 4, images with different focal lengths can be taken without the use of the focus adjustment mechanism.

Restoration processing is described, for example, in NPL 1 and NPL 2 (see PTL 5).

Edge enhancement is described, for example, in PTL 6.

CITATION LIST

Patent Literature

PTL 1
Japanese Patent No. 3753201
PTL 2
Japanese Patent Application Laid-Open No. 2005-164983
PTL 3
Japanese Patent Application Laid-Open No. 2003-270526
PTL 4
Japanese Patent Application Laid-Open No. 2007-193020
PTL 5
Japanese Patent Application No. 8-329549, paragraphs [0023], [0024]
PTL 6
Japanese Patent Application Laid-Open No. 2011-124712

Non-Patent Literature

NPL 1
Institute of Electronics and Communication Engineers Academic Journal, November, 1984, Vol. J67-D No10
NPL 2
"O plus E" separate volume, November, 1986

SUMMARY OF INVENTION

Technical Problem

However, in the technology of PTL 3, when a pupil is limited by a diaphragm, images need to be taken with time division, and therefore images with different focal lengths cannot be taken at the same time. When the pupil is not limited, images are disadvantageously taken together with flare light.

Also in the technology of PTL 4, imaging with time division is necessary for taking images with a long focal length and taking images with a short focal length.

The present invention has been made in view of such circumstances, and an object of the present invention is to provide an imaging apparatus capable of simultaneously acquiring a plurality of images with different focal lengths.

Solution to Problem

In order to solve the above problems, one aspect of the present invention is an imaging apparatus, including: an image formation lens having focal lengths different in every region; a light receiving section having a plurality of light receiving elements; a plurality of optical elements respectively provided corresponding to a plurality of the light receiving elements to make the corresponding light receiving elements receive an object light beam that passed through predetermined pupil regions in an exit pupil of the image formation lens; and an image generation section adapted to generate an image of an object from imaging signals of a plurality of the light receiving elements, wherein a plurality of first optical elements out of the plurality of the optical elements make an object light beam, which passes through a region having a first focal length of the image formation lens and a first pupil region in the exit pupil, incident into corresponding light receiving elements, and a plurality of second optical elements out of the plurality of the optical elements make an object light beam, which passes through a region having a second focal length of the image formation lens and a second pupil region in the exit pupil, incident into corresponding light receiving elements.

The image generation section may select, for generation of the image of the object, any one of the pupil regions in the exit pupil through which a light beam passes and generates the image of the object with use of imaging signals of a plurality of the light receiving elements that receive an object light beam that passed through the selected pupil region.

In the case of selecting, for generation of the image of the object, any one of the pupil regions in the exit pupil through which an object light beam passes, the image generation section may select, based on an object distance and focal lengths each corresponding to a plurality of the pupil regions of the exit pupil, at least one of the pupil regions through which an object light beam that forms an image at a position of the light receiving section passes.

The image generation section may select, based on a range of the object distance and focal lengths each corresponding to a plurality of the pupil regions of the exit pupil, a plurality of the pupil regions through which the object light beam that forms an image at the position of the light receiving section passes.

A plurality of the optical elements may be prism elements that make the corresponding light receiving elements receive an object light beam that passed through the predetermined pupil regions.

The prism elements may be fluid prism elements having a prism interface formed from a fluid interface between a first fluid and a second fluid which are different in refractivity from each other, and the imaging apparatus may further include a control section adapted to control an inclination of the prism interface with respect to an optical axis of the image formation lens so as to control a direction of luminous flux received by the light receiving elements each corresponding to a plurality of the prism elements.

The control section may control the inclination of the prism interface based on an object distance so as to direct the direction of the luminous flux to be received by the corresponding light receiving elements toward the pupil region through which an object light beam that forms an image at the position of the light receiving section passes.

The imaging apparatus may further include: a prism housing adapted to hold the first fluid and the second fluid; and a divider plate adapted to divide an inside of the prism housing, along the optical axis, into a first region filled with the first fluid and a second region filled with the second fluid, wherein the divider plate may have a plurality of through holes formed corresponding to positions at which a plurality of the fluid prism elements are formed, and the control section may control an inclination of the prism interface with respect to the optical axis by controlling a position of the fluid interface in respective first lateral surface portions of a plurality of the through holes and a position of the fluid interface in second lateral surface portions opposite to the first lateral surface portions.

When the light receiving elements are made to receive an object light beam that passed through a pupil region in the exit pupil including the optical axis, the control section may control so that the fluid interface is generally perpendicular to the optical axis, whereas when the light receiving elements are made to receive an object light beam that passed through a pupil region in the exit pupil which does not include the optical axis, the control section may control so that the fluid interface is inclined with respect to the optical axis.

When the light receiving elements are made to receive an object light beam that passed through a pupil region in the exit pupil which does not include the optical axis, the control section may control so that the fluid interface is inclined with respect to the optical axis at a first inclination angle, whereas when the light receiving elements are made to receive an object light beam that passed through another pupil region in the exit pupil which does not include the optical axis, the control section may control so that the fluid interface is inclined with respect to the optical axis at a second inclination angle.

At least any one of a plurality of the through holes may have a first lateral surface portion and a second lateral surface portion different in thickness from each other, and the control section may switch the inclination of the fluid interface with respect to the optical axis to a different inclination by switching between a state where the first fluid is filled in a region surrounded with the first lateral surface portion and the second lateral surface portion and a state where the second fluid is filled in the region.

A plurality of the light receiving elements may be placed in a matrix form, the divider plate may be formed so that a first divider section extending in a column direction and a second divider section extending in a column direction are provided alternately in a row direction, the first divider section may have, on both sides, a lateral surface portion with a first thickness along an optical axis direction, while the second divider section may have, on both sides, a lateral surface portion with a second thickness along the optical axis direction, each of a plurality of the through holes may be formed from a lateral surface portion of the first divider section and a lateral surface portion of the second divider section which is adjacent to the first divider section, a first fluid side of the first divider section and a first fluid side of the second divider section may form generally the same plane, and the control section may control the region surrounded with the first lateral surface portion and the second lateral surface portion in the state of being filled with the first fluid so that the inclination of the fluid interface with respect to the optical axis is different from each other in the column direction.

The control section may control the inclination of the interface with respect to the optical axis by controlling an internal pressure of the region that holds the first fluid.

A plurality of the optical elements may be microlenses each provided to have an optical axis being deflected with respect to a light receiving opening so that an object light beams that passed through predetermined pupil regions is received by corresponding light receiving elements.

A plurality of the optical elements may be shielding elements with an opening having directivity to a predetermined pupil region for the corresponding light receiving elements.

A plurality of the optical elements may have first polarizing filters adapted to transmit polarization components different from each other in a plurality of the pupil regions, and second polarizing filters each provided corresponding to a plurality of the light receiving elements to respectively transmit different polarization components.

A plurality of the optical elements may have a plurality of first wavelength filters adapted to transmit wavelength components different from each other in a plurality of the pupil regions, and a plurality of second filters provided corresponding to a plurality of the light receiving elements to respectively transmit different wavelength components.

Each optical element in a plurality of the optical elements may be a microlens provided for every unit of a plurality of the light receiving elements, the microlens making an object light beam, which passes through a region having a first focal length of the image formation lens and a first pupil region in the exit pupil, incident into the first light receiving elements, and making an object light beam, which passes through a region having a second focal length of the image formation lens and a second pupil region in the exit pupil, incident into the second light receiving elements.

The image formation lens may have focal lengths different in every circular region and every ring-shaped region sectioned based on a distance from the center of the image formation lens, and a plurality of the optical elements may be microlenses each having a different focal length and may be shielding elements with a ring-shaped opening formed thereon.

The image generation section may perform processing to compensate influence exerted on an image quality of the image of the object by omission of image signals of the light receiving elements, which receive an object light beam that passed through a specific region of the image formation lens, the omission being given in a part of the region where the light receiving elements are placed and where an object light beam that passed through a region other than the specific region of the image formation lens is present.

The image generation section may perform processing to remove the influence exerted on the image quality of the image of the object resulting from the object light beam coming incident into a light receiving element other than the light receiving elements corresponding to the predetermined pupil region.

The processing to remove the influence of the image quality may include at least any one of blurring correction, contrast correction, and edge enhancement of the image of the object.

It is to be noted that the foregoing summary of invention does not include all the required characteristics of the present invention. Subcombinations of these characteristic groups may also be embraced in the invention.

Advantageous Effects of Invention

According to the present invention, it becomes possible to select an image with a desired focal length. Since pixels can be selected and synthesized according to an object distance in particular, a wide range of object distances can be supported. Further, a plurality of images with different focal lengths can be obtained as separate image data simultaneously and independently. This makes it possible to achieve synchronous imaging and dynamic imaging which were conventionally impossible.

BRIEF DESCRIPTION OF DRAWINGS

FIG. 13 is a schematic view showing one example of a microlens 152a and a plurality of light receiving element groups 1162 provided corresponding to the microlens 152a.

FIGS. 26A and 26B illustrate two different views of a point image restored by deconvolution processing.

DESCRIPTION OF EMBODIMENTS

While the present invention is to be described hereinafter through embodiments of the invention, it should be understood that the following embodiments do not limit the invention defined by the claims. It should also be understood that not all the combinations of the characteristics described in the embodiments are necessarily indispensable as the solution of the invention.

Figure 1:
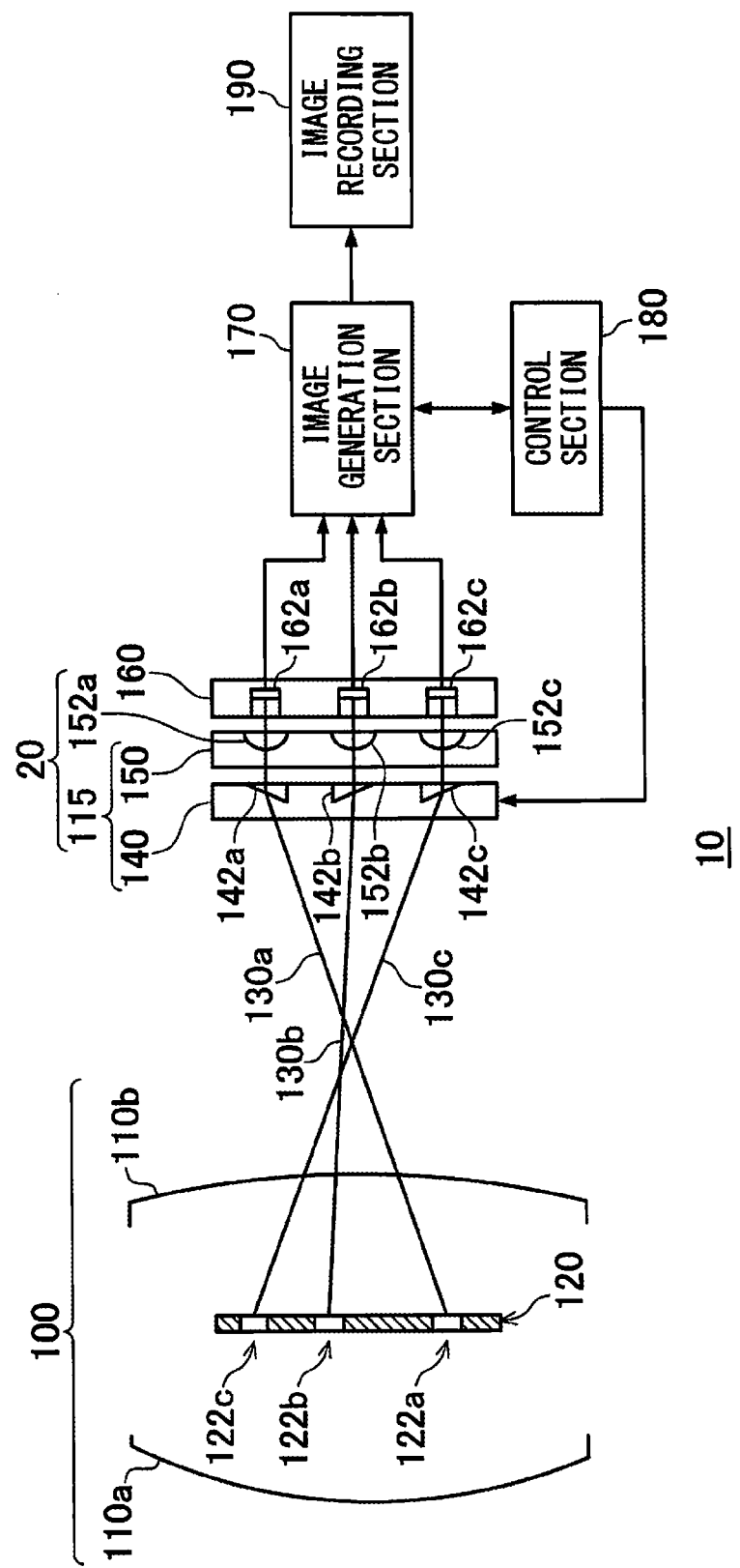
FIG. 1 is a view schematically showing one example of a block configuration of an imaging apparatus 10.

FIG. 1 schematically shows one example of a block configuration of an imaging apparatus 10. The imaging apparatus 10 according to the present embodiment provides a function to take images with different focal lengths. In particular, an optical configuration of the imaging apparatus 10 provides an imaging apparatus capable of compactly mounting the function with use of a fixed imaging lens. The imaging apparatus 10 includes a lens system 100, a light receiving unit 20, an image generation section 170, a control section 180, and an image recording section 190. The light receiving unit 20 has an optical device 115 and a light receiving section 160.

The lens system 100 is a single lens system for imaging. The lens system 100 includes one or more lenses 110. An object light beam that passed through the lens system 100 passes through the optical device 115, before being received by the light receiving section 160.

The lens system 100 is a lens system having focal lengths different in every region. For example, the lens system 100 may have a lens system 100a that is a progressive refraction lens. In this drawing, an object-side optical surface of the lens 110a provides focal lengths different in every region for easy understanding of the difference in focal length. It suffices to configure the lens system 100 so that optical paths that impart different focal lengths are provided by the lens system as a whole, and therefore it is not necessary to provide the difference in focal length by a specific optical surface of a specific lens. The lens 110 may also have refractive power that varies with a refractivity distribution.

The optical device 115 makes different regions on the light receiving section 160 to receive a light beam that passed through a pupil region 122a of an exit pupil 120 of the lens system 100, a light beam that passed through a pupil region 122b, and a light beam that passed through a pupil region 122c. The light receiving section 160 feeds signals made of the light beams received in the different regions to the image generation section 170 as image signals. The image generation section 170 generates images with different focal lengths based on the image signals. The image recording section 190 records the images generated in the image generation section 170. The image recording section 190 may record the images in a nonvolatile memory. The image recording section 190 may have the nonvolatile memory. The nonvolatile memory may also be an external memory detachably provided on the imaging apparatus 10. The image recording section 190 may output the images to the outside of the imaging apparatus 10.

The optical device 115 has a deflection section 140 and a microlens section 150. The deflection section 140 includes a plurality of prism elements 142a-142c as one example of the deflection optical element. The microlens section 150 includes a plurality of microlenses 152a-152c. The light receiving section 160 has a plurality of light receiving elements 162a-162c. In this drawing, three light receiving elements 162a-162c, three microlenses 152a-152c, and three prism elements 142a-142c are shown for easy understanding, though the drawing not necessarily indicates that only three optical elements are respectively provided. It should naturally be understood that arbitrary numbers of optical elements are respectively provided for taking images of an object. A plurality of the microlenses 152a-152c may generally be referred to as the microlens 152 or a plurality of the microlenses 152. A plurality of the light receiving elements 162a-162c may also generally be referred to as the light receiving element 162 or a plurality of the light receiving elements 162. Similarly, other optical elements may also generally be referred with reference signs with their suffixes being omitted.

A plurality of the light receiving elements 162 may form MOS-type image sensors. A plurality of the light receiving elements 162 may form solid-state image sensors such as CCD-type image sensors besides the MOS-type image sensors.

The microlenses 152 are each provided corresponding to a plurality of the light receiving elements 162. A plurality of the microlenses 152 re-image an object light beam which was imaged by the lens system 100, and the corresponding light receiving elements 162 are made to receive the images. The illustrated microlenses 152a-152c are each provided corresponding to the light receiving elements 162a-162c. The microlenses 152a re-image an object light beam imaged by the lens system 100, and the light receiving elements 162a are made to receive the image. Similarly, the microlenses 152b and 152c respectively re-image an object light beam imaged by the lens system 100, and the light receiving elements 162b and 162c are made to receive the images. The microlenses 152 limit the size of the exit pupil 120 through which respective luminous flux of the light receiving elements 162 passes. For example, the microlens 152 has refractive power large enough to make the respective light receiving elements 162 receive a light beam that passed through a partial region of the exit pupil 120. For example, the microlens 152 may have the refractive power large enough to make the respective light receiving elements 162 receive a light beam that passed through a region having an area of ¼ or less of the exit pupil 120.

The prism elements 142 are provided corresponding to a plurality of the light receiving elements 162. The prism elements 142, the microlenses 152, and the light receiving elements 162 are provided in one-to-one relation. For example, the prism element 142a is provided corresponding to the microlens 152a and the light receiving element 162a. Out of the prism elements 142, the microlenses 152, and the light receiving elements 162, a group of the optical elements relating to each other is distinguished by suffixes "a" to "c" added to their reference numerals.

The prism elements 142 are one example of the optical elements which make corresponding light receiving elements 162 receive an object light beam that passed through predetermined pupil regions 122. More specifically, the prism element 142a makes the light receiving element 162a receive an object light beam 130a that passed through the pupil region 122a in the exit pupil 120 of the lens system 100 via the microlens 152a. The prism element 142b makes the light receiving element 162b receive an object light beam 130b that passed through the pupil region 122b in the exit pupil 120 of the lens system 100 via the microlens 152b. Meanwhile, the prism element 142c makes the light receiving element 162c receive an object light beam 130c that passed through the pupil region 122c in the exit pupil 120 of the lens system 100 via the microlens 152c.

More specifically, the prism elements 142a-142c have prism angles for making each of the light receiving elements 162a-162c receive each of the object light beams 130a-130c that passed through the pupil regions 122a-122c. The object light beam 130a which passes through the pupil region 122a and comes incident into the light receiving element 162a, the object light beam 130b which passes through the pupil region 122b and comes incident into the light receiving element 162b, and the object light beam 130c which passes through the pupil region 122c and comes incident into the light receiving element 162c are to pass through optical surfaces of the lens 110a which are different from one another. Accordingly, the light receiving elements 162a-162c receive the light beam that passed through the regions of the lens system 100 which are different in focal length from one another.

Thus, the prism elements 142 make each of the corresponding light receiving elements 162, among a plurality of the light receiving elements 162, receive the object light beam that passed through a predetermined pupil region 122 in the exit pupil 120 of the lens 110. More specifically, a plurality of first prism elements including the prism element 142a, out of a plurality of the prism elements 142, make the corresponding light receiving elements 162 receive an object light beam that passes through a region having a first focal length of the lens 110 and through the pupil region 122a. A plurality of second prism elements including the prism element 142b, out of a plurality of the prism elements 142, make the corresponding light receiving elements 162 receive an object light beam that passes through a region having a second focal length of the lens 110 and through the pupil region 122b in the exit pupil 120. A plurality of third prism elements including the prism element 142c, out of a plurality of the prism elements 142, make the corresponding light receiving elements 162 receive an object light beam that passes through a region having a third focal length of the lens 110 and through the pupil region 122c.

The light receiving elements 162 output imaging signals with the strength corresponding to a light receiving amount to the image generation section 170. The image generation section 170 generates an image of an object from the imaging signals of a plurality of the light receiving elements 162. More specifically, the image generation section 170 generates image signals indicating images with different focal lengths based on the imaging signals fed from the light receiving elements 162. In this example, the light beams that the light receiving elements 162a-162c can receive are limited to those that passed through each of the pupil regions 122a-122c. Therefore, the image generation section 170 generates signals of an image with the first focal length based on imaging signals from a part of the light receiving elements 162 that receive a light beam that passed through the pupil region 122a. The image generation section 170 also generates signals of an image with the second focal length based on the imaging signals from a part of the light receiving elements 162 that receive a light beam that passed through the pupil region 122b. The image generation section 170 also generates signals of an image with the third focal length based on the imaging signals from a part of the light receiving elements 162 that receive a light beam that passed through the pupil region 122c. The signals of these images may respectively be referred to as, with use of a size of the focal length, a long focal-length image, a middle focal-length image, and a short focal-length image.

The image generation section 170 may generate one image by combining the images with different focal lengths. According to the optical device 115, it is possible to provide a clear image of an object which positions inside the depth of field of lens elements that correspond to any one of the pupil regions 122a-122c. Accordingly, generating one image by combining images with different focal lengths allows the imaging apparatus 10 to generate an image having an effectually deep depth of field. It is to be noted that the image generation section 170 may generate images with different focal lengths as separate images. For example, images with different focal lengths may be generated as images with different magnifications. Thus, according to the optical device 115, images with different focal lengths can be obtained in one shot with use of the single lens system 100. Since activation of the lens system 100 is not involved, a compact imaging apparatus can be provided.

The imaging apparatus 10 may be imaging equipment, such as mobile phones with a camera function and digital cameras. It is to be noted that a functional block of the lens system 100, the optical device 115, and the light receiving section 160 as well as a functional block of the image generation section 170 and the control section 180 may be provided as imaging devices for imaging equipment. For example, the imaging devices may be imaging modules built into the imaging equipment.

It is to be noted that in the present drawing, the pupil regions 122a-122c in the exit pupil 120 are illustrated with white blank space for the purpose of intelligibly showing that the light receiving elements 162 receive a light beam that passed through specific partial regions of the exit pupil 120 with the function of the microlens 152. The regions other than the pupil regions 122a-122c are illustrated with slanting lines. This does not mean that an object light beam does not pass through regions other than the pupil regions 122a-122c.

It is to be noted that the control section 180 controls the direction in which the deflection section 140 deflects an object light beam. For example, the control section 180 controls the prism angle of the prism element 142. Since the control section 180 controls the direction of the deflection by the deflection section 140, it becomes possible to control, for example, which light beam, among the light beams passing through respective pupil regions, the respective receiving elements receive. Specific control details by the control section 180 are described later.

Figure 2:
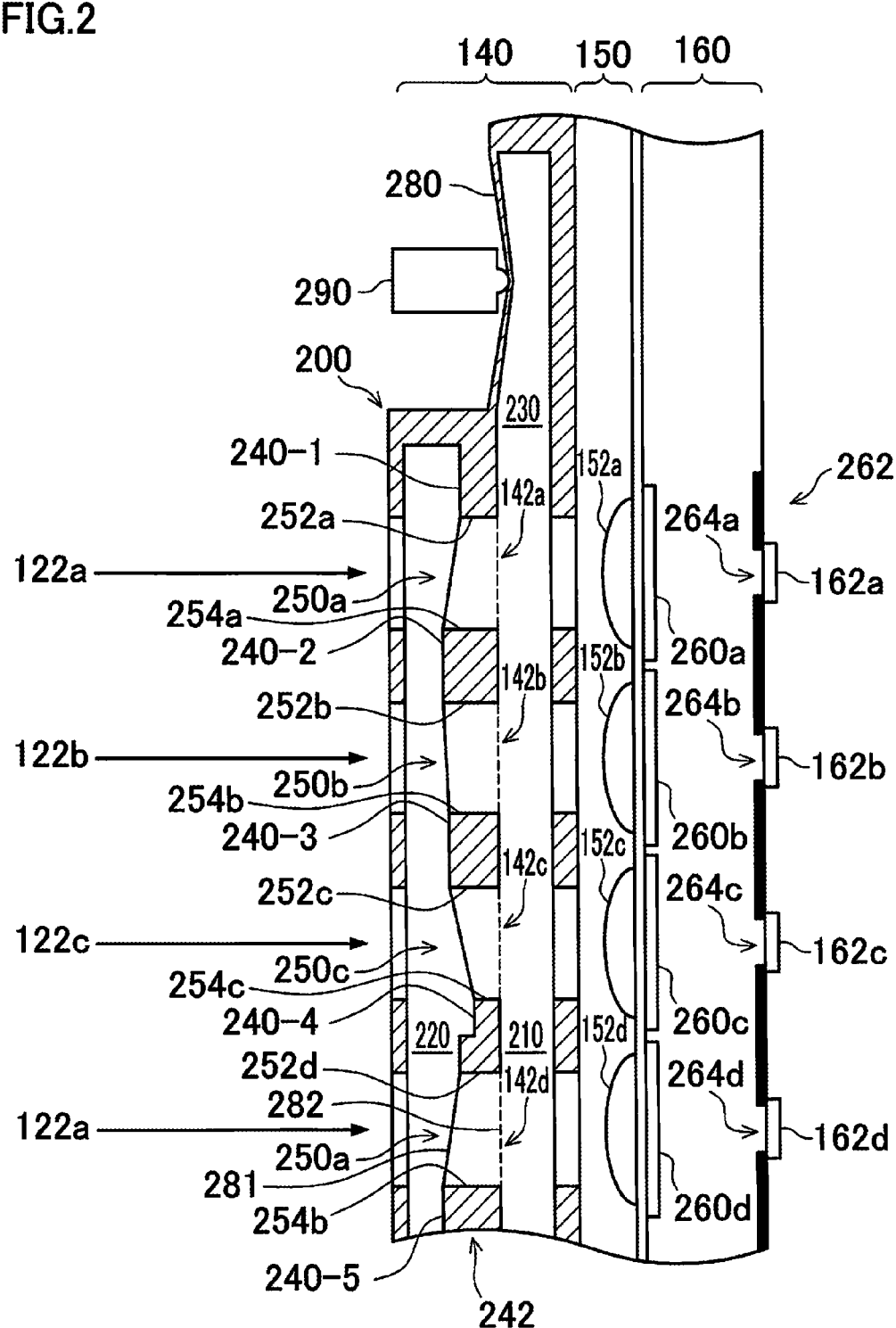
FIG. 2 is a view schematically showing one example of a configuration of a deflection section 140, a microlens section 150, and a light receiving section 160.

FIG. 2 schematically shows one example of a configuration of the deflection section 140, the microlens section 150, and the light receiving section 160. In this example, a plurality of the prism elements 142 included in the deflection section 140 are fluid prism elements formed from fluid interfaces different in refractivity from each other. Prism angles of the prism elements 142 are defined by angles of the fluid interfaces.

The deflection section 140 has a housing 200 adapted to hold a first fluid and a second fluid, a divider plate 242, and a driving section 290. The divider plate 242 divides the inside of the housing 200, along the optical axis of the lens system 100, into a first fluid region 210 filled with a first fluid and a second fluid region 220 filled with a second fluid. The first fluid and the second fluid are different in refractivity from each other and have a property of being immiscible with each other in a contact state like water and oil. Examples of a combination of the first fluid and the second fluid include a combination of PDMS (Poly-Dimethyl-Siloxane) and pure water. Here, it is assumed that the first fluid is larger in refractivity than the second fluid. Preferably, the first fluid and the second fluid are substantially equal in density.

The divider plate 242 has a plurality of through holes 250a-250d formed corresponding to the positions at which a plurality of the prism elements 142a-142d are formed. The prism elements 142a-142c shown in FIG. 1 are formed at the positions where the through holes 250a-250c are respectively formed. The shape of the through hole 250 viewed from an object-side surface or an image-side surface of the housing 200 may be a square, a rectangular, a trapezoid, a circle, an ellipse, or the like, and may be other various shapes.

Translucent portions made of a transparent material such as glass are formed on the object-side surface and image-side surface of the housing 200. The translucent portions are formed at the positions corresponding to the through holes 250, the microlenses 152, and the light receiving elements 162, so that an object light beam passes through the translucent portion formed on the object-side surface, the through holes 250, and the translucent portion formed on the image-side surface before coming incident into the corresponding microlens 152. It is to be noted that the entire object-side surface and image-side surface of the housing 200 may be made of a transparent material such as glass.

The divider plate 242 includes divider sections 240-1 to 240-5. The through hole 250 is formed from a space between the divider sections 240 that are opposed to each other. The divider sections 240 prevent contact between the first fluid and the second fluid. The first fluid and the second fluid come into contact with each other inside the through hole 250 and form an interface that serves as the prism element 142.

The through hole 250a has a lateral surface portion 252a (equivalent to the first lateral surface portion), and a lateral surface portion 254a (equivalent to the second lateral surface portion). The lateral surface portion 252a and the lateral surface portion 254a are respectively lateral surface portions of the divider section 240-1 and the divider section 240-2 that are opposed to each other. The lateral surface portion 252a has a first thickness along an optical axis direction of the lens system 100, while the lateral surface portion 254a has a second thickness along the optical axis direction of the lens system 100. In short, the through hole 250a is formed so as to be surrounded with lateral surfaces including the lateral surface portion 252a and the lateral surface portion 254a of the divider plates 242 which are different in thickness from each other. For example, when the through hole 250a has a square opening, the through hole 250a is formed so as to be surrounded with the lateral surface portion 252a, the lateral surface portion 254a, and two lateral surface portions which join the lateral surface portion 252a and the lateral surface portion 254a. Here, the second thickness is assumed to be larger than the first thickness.

The through hole 250b has a lateral surface portion 252b and a lateral surface portion 254b. The lateral surface portion 252b and the lateral surface portion 254b are respectively lateral surface portions of the divider section 240-2 and the divider section 240-3 that are opposed to each other. The lateral surface portion 252b has the second thickness along the optical axis direction of the lens system 100, while the lateral surface portion 254b has a third thickness along the optical axis direction of the lens system 100. The third thickness is assumed to be larger than the first thickness and smaller than the second thickness. Unlike the through hole 250a, the through hole 250b has the lateral surface portion 252b with the second thickness and the lateral surface portion 254b with the third thickness in order in a direction of a plurality of the through holes 250 being arrayed. Since other aspects are the same as those of the through holes 250a, description thereof is omitted.

The through hole 250c has a lateral surface portion 252c and a lateral surface portion 254c. The lateral surface portion 252c and the lateral surface portion 254c are respectively lateral surface portions of the divider section 240-3 and the divider section 240-4 that are opposed to each other. The through hole 250c is formed from the lateral surface portion 252c having the third thickness and the lateral surface portion 254c having a fourth thickness. The fourth thickness is assumed to be smaller than the first thickness. Here, a difference in thickness between the second thickness and the third thickness is assumed to be different from a difference in thickness between the third thickness and the fourth thickness.

The through hole 250d has the same shape as the through hole 250a. The through hole 250d is formed from a lateral surface portion 252d having the first thickness and a lateral surface portion 254d having the second thickness. The lateral surface portion 252d and the lateral surface portion 254d are respectively provided by the divider section 240-4 and the divider section 240-5. The divider section 240-4 has a lateral surface portion 254c with the fourth thickness on one side and a lateral surface portion 252d with the first thickness on the other side. Although the through holes are shown only up to the through hole 250d in this example, the through hole 250a, the through hole 250b, and the through hole 250c are formed repeatedly so as to be aligned in this order at equal intervals on the divider plate 242.

When the pressure of the first fluid filled in the first fluid region 210 is set at a specific pressure, a planate interface is formed corresponding to the pressure so that a pressure difference between the fluids and surface tension are balanced. When the pressure of the first fluid is set at the first pressure so as to be balanced in the state where the second fluid is filled in each of the through holes 250, a fluid interface shown with a broken line in the drawing, like the prism element 282, is formed. More specifically, the fluid interface is supported, in each of the through holes 250, by an end of the lateral surface portion 252 on the first fluid region 210 side and an end of the lateral surface portion 254 on the first fluid region 210 side. The divider plate 242 has generally a planate end face on the first fluid side. More specifically, each of the first fluid-side of the divider section 240 forms generally the same plane. Since the end face is parallel to the image-side housing 200, the fluid interface shown with a broken line has substantially no prism effect.

On the contrary, when the pressure of the first fluid is increased to a second pressure so as to be balanced in the state where the first fluid is filled in each of the through holes 250, the position of the fluid interface is moved to the second fluid side, and a fluid interface shown with a solid line in the drawing, like the prism element 281, is formed. For example, the fluid interface is supported, in each of the through holes 250, by an end of the lateral surface portion 252 on the second fluid region 220 side and an end of the lateral surface portion 254 on the second fluid region 220 side. The fluid interface has an inclination corresponding to the thickness of the lateral surface portion which forms each of the through holes 250. Therefore, in this state, there is formed a prism sequence composed of prisms having three different kinds of prism angles formed repeatedly in order.

A description is given of the configuration of the microlens section 150 and the light receiving section 160. A plurality of the microlenses 152 are provided on a transparent substrate corresponding to a plurality of the through holes 250. The light receiving section 160 has a plurality of color filters 260, light-shielding section 262, and a plurality of the light receiving elements 162. A plurality of the color filters 260 and a plurality of the light receiving elements 162 are provided corresponding to the through holes 250. More specifically, the microlenses 152, the color filters 260, and the light receiving elements 162 are each provided corresponding to a plurality of the through holes 250.

Each of the color filters 260 selectively transmits object light beams of predetermined wavelength bands, among light beams that passed through corresponding through holes 250 and microlenses 152, and makes the corresponding light receiving elements 162 receive the light beams. The color filter 260 may any one of a color filter which transmits light beams in wavelength bands belonging to red color, a color filter which transmits light beams in wavelength bands belonging to a green color, and a color filter which transmits light beams in wavelength bands belonging to a blue color. The color filters 260 are arrayed on the light receiving elements 162 according to a predetermined pattern so that color images are taken.

In order to prevent interference between adjacent pixels, the light-shielding sections 262 have openings 264 that demarcate respective light receiving openings of a plurality of the light receiving elements 162, the openings 264 being formed at the positions corresponding to each of a plurality of the light receiving elements 162. An object light beam goes to the light receiving elements 162 through the through holes 250, the microlenses 152, and the color filters 260. A plurality of the light receiving elements 162 respectively receive a light beam that passed through corresponding openings 264 and generate voltage signals that form imaging signals by photoelectric conversion.

In the state where the fluid interface is formed as shown with a broken line in the present drawing, the fluid interface does not have a prism effect. Accordingly, in this state, the light receiving elements 162 receive the light beam that passed through a region of the exit pupil 120 around the optical axis. Therefore, an image formed by a plurality of the light receiving elements 162 turns into an image with a focal length belonging to a region in the vicinity of the optical axis of the lens system 100. In this case, while images are taken with one focal length, images of high resolution can be obtained.

In the state where the fluid interface is formed as shown with a solid line in the present drawing, fluid interfaces with different prism angles are formed in the through holes 250a-250c. Therefore, in this state, the direction of luminous flux to be received by the light receiving elements 162a-162c is directed to the pupil regions 122 of the exit pupil 120 which are different from each other. In this case, the fluid interface formed in the through hole 250a, the fluid interface formed in the through hole 250b, and the fluid interface formed in the through hole 250c form the prism element 142a, the prism element 142b, and the prism element 142c shown in FIG. 1, respectively. In this state, images taken with a plurality of focal lengths can be obtained.

As described in the foregoing, the prism elements 142 are fluid prism elements having a prism interface formed from a fluid interface between the first fluid and the second fluid which are different in refractivity from each other. The control section 180 controls the inclination of the prism interface with respect to the optical axis of the lens system 100 so as to control the direction of the luminous flux to be received by the light receiving elements 162 that respectively correspond to a plurality of the prism elements 142. More specifically, the control section 180 controls the inclination of the prism interface with respect to the optical axis by controlling the position of the fluid interface in the lateral surface portion 252 of the through hole 250 and the position of the fluid interface in the lateral surface portion 254 opposed to the lateral surface portion 252.

For example, the control section 180 controls the pressure of the first fluid by controlling the pressure inside the fluid region 230 that communicates with the first fluid region 210. More specifically, the housing 200 has an elastic surface 280 which is in contact with the first fluid inside the fluid region 230. Moreover, the deflection section 140 has a driving section 290 adapted to displace the elastic surface 280 so as to control a volume of the fluid region 230. As the driving section 290, a piezoelectric element may be provided. The piezoelectric element may be a piezo device. The control section 180 controls the voltage applied to the piezoelectric element to change the shape of the piezoelectric element, so that a top end of the piezoelectric element that comes into contact with the elastic surface 280 is displaced in a horizontal direction on the page.

In the case of moving the interface between the first fluid and the second fluid toward the object side along the lateral surface portion of the through hole 250, the control section 180 displaces the top end of the driving section 290 in a direction of decreasing the volume of the fluid region 230. As a consequence, the internal pressure of the first fluid increases and the fluid interface moves toward the object side. In the case of moving the fluid interface toward the image side along the lateral surface portion of the through hole 250, the control section 180 displaces the top end of the driving section 290 in a direction of increasing the volume of the fluid region 230. As a consequence, the internal pressure of the first fluid decreases and the fluid interface moves toward the image side.

When the control section 180 controls the internal pressure of the fluid region 210 as in the case of the deflection section 140 in this example, the position of the fluid interface in the lateral surface portion 252 of the through hole 250 and the position of the fluid interface in the lateral surface portion 254 opposed to the lateral surface portion 252 are controlled, as a result of which the inclination of the fluid interface with respect to the optical axis is controlled. More specifically, the control section 180 can control the inclination of the prism element 142 by controlling the internal pressure of the fluid region 210. Particularly, as in the case with the divider plate 242 of this example, the control section 180 can switch the inclination of the fluid interface with respect to the optical axis to a different inclination by switching between a state where the first fluid is filled in a region surrounded with both the lateral surface portions of the divider section 240 and a state where the second fluid is filled in the region. According to the deflection section 140 of this example, when the light receiving elements 162 are made to receive an object light beam 130 that passed through a pupil region in the exit pupil 120 including the optical axis, the control section 180 can control so that the fluid interface is generally perpendicular to the optical axis, whereas when the light receiving elements 162 are made to receive an object light beam 130 that passed through a pupil region 122 in the exit pupil 120 which does not include the optical axis, the control section 180 can control so that the fluid interface is inclined with respect to the optical axis. Since the direction of the luminous flux to be received by the light receiving elements 162 can be controlled at high speed by controlling the internal pressure of the fluid region 210, imaging with multifocal lengths and imaging with high resolution can be switched at high speed.

Figure 3:
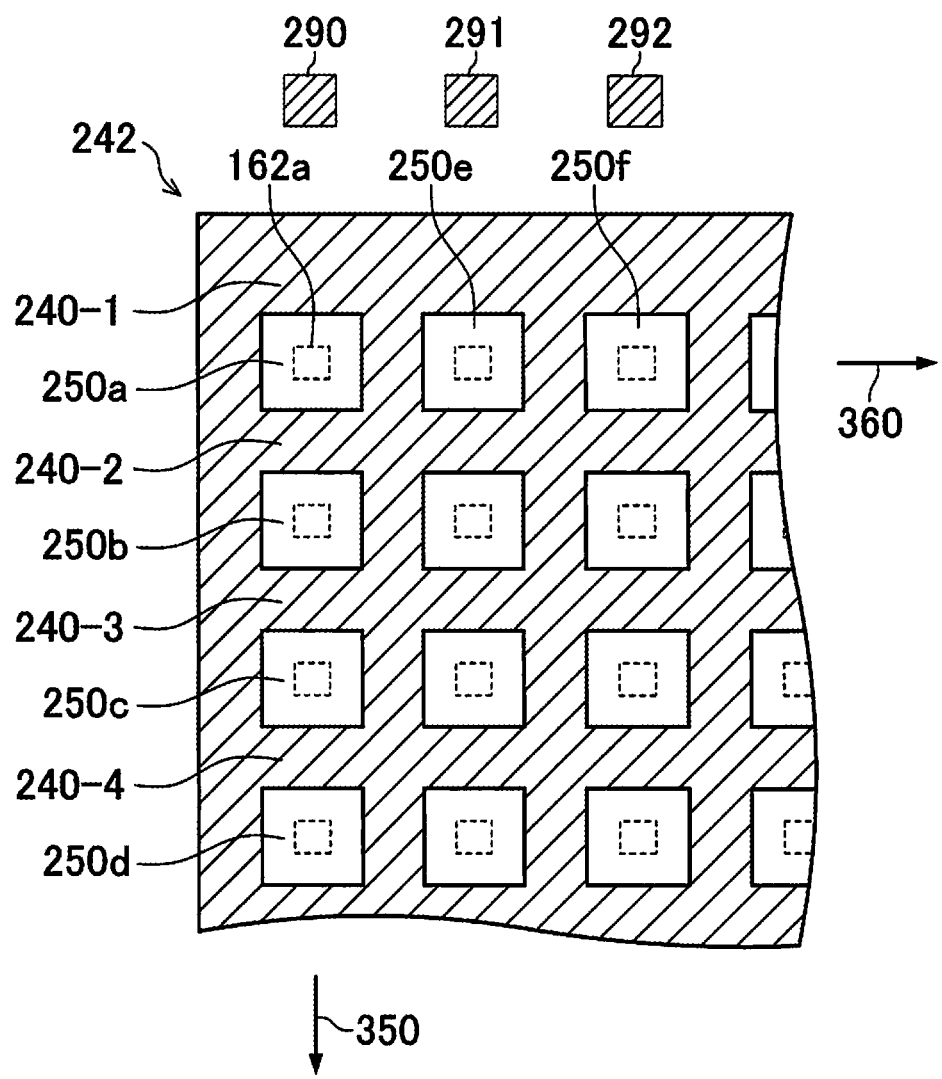
FIG. 3 is a view showing a schematic cross sectional view of the deflection section 140 taken along a plane vertical to an optical axis.

FIG. 3 shows a schematic cross section of the deflection section 140 taken along a plane vertical to the optical axis. This drawing shows a schematic cross section of the divider plate 242 of FIG. 2. The object light beam is assumed to travel toward the page, and the positions of the light receiving elements 162 are schematically shown with a broken line for reference. As shown in the drawing, the divider plate 242 has the through holes 250 formed in a matrix form. The light receiving elements 162 are also provided in the positions corresponding to the through holes 250. More specifically, the through holes 250 and a plurality of the light receiving elements 162 are placed in a matrix form. The through holes 250 and the light receiving elements 162 are provided generally at equal intervals in a row direction 350 and in a column direction 360.

More specifically, the divider section 240-1, the divider section 240-2, the divider section 240-3, and the divider section 240-4 are members extending in the column direction 360. Space between these rows is divided by members extending in the row direction 350. As a consequence, a plurality of columns of the through holes arrayed in the row direction 350 are formed in addition to the through holes 250a-250d. For example, columns of the through holes arrayed in the row direction 350 are formed in the row starting with the through hole 250a, in the row starting with the through hole 250e, and in the row starting with through hole 250f.

As described in reference to FIG. 2, the divider section 240-1 has, on a lateral side, the lateral surface portion with the first thickness along the optical axis direction of the lens system 100. The divider section 240-2 has, on both lateral sides, the lateral surface portion with the second thickness along the optical axis direction of the lens system 100. The divider section 240-3 has, on both lateral sides, the lateral surface portion with the third thickness along the optical axis direction of the lens system 100. The divider section 240-4 has, on lateral sides, the lateral surface portion with the fourth thickness and the lateral surface portion with the first thickness along the optical axis direction of the lens system 100. In short, the divider plate 242 has divider sections which present a difference in thickness between the lateral surface portions that are opposed to each other. Moreover, two or more kinds of divider sections are formed in sequence so that the difference in thickness is different between adjacent through holes 250. As a consequence, the through holes 250 that provide prism angles, which are different from each other in the row direction 350, are placed in sequence in a plurality of rows.

In this drawing, there was shown the divider plate 242 forming three kinds of divider sections so that prism angles with three kinds of inclinations are simultaneously formed. In the case of simultaneously forming two or more kinds of prism angles, it suffices to alternately form two kinds of divider sections. In short, it suffices to form the through hole 250 from a first divider section having, on both lateral sides, a lateral surface portion with the first thickness along the optical axis direction of the lens system 100 and from a second divider section having, on both lateral sides, a lateral surface portion with the second thickness along the optical axis direction. More specifically, each of the through holes 250 is formed from a lateral surface portion of the first divider section and a lateral surface portion of the second divider section which is adjacent to the first divider section. The control section 180 can make the fluid interfaces having inclinations, with respect to the optical axis, different from each other in the column direction 360 by controlling so that the regions surrounded with the lateral surface portions of the divider section 240 are in the state of being filled with the first fluid.

Moreover, the through holes 250a-250d communicate via the fluid region 210. While the fluid region 210 may be partitioned into a plurality of regions, the fluid region 210 also needs not be partitioned. When the fluid region 210 is partitioned, a driving section is provided to each of a plurality of the partitioned fluid regions 210, and each of the driving sections controls the pressure of the first fluid inside the corresponding fluid region 210. In the example of this drawing, a driving section 290, a driving section 291, and a driving section 292 are provided for every row. As a consequence, as compared with the case where the internal pressure of the first fluid regions is controlled by one driving section, the prism elements can be controlled promptly. Even in the case where the fluid region 210 is not partitioned into a plurality of regions and all the through holes communicate in the fluid region 210, a plurality of the driving sections may also be provided. That is, the internal pressure of the first fluid region 210 may be controlled by a plurality of the driving sections.

Figure 4:
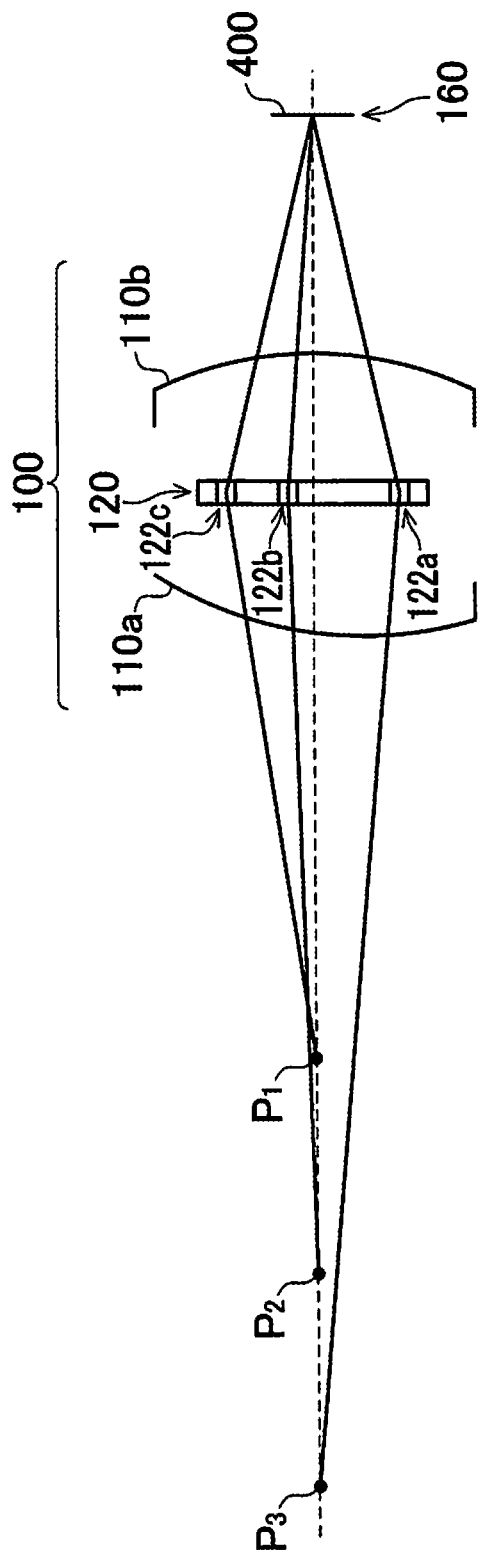
FIG. 4 is a view schematically showing an image formation relation between the light receiving section 160 and an object.

FIG. 4 schematically shows an image formation relation between the light receiving section 160 and an object. Reference characters P1, P2, and P3 respectively designate positions of a short-distance object, a middle-distance object, and a long-distance object. The light beam from the position P3 passes through a third optical surface and a pupil region 122a of the lens 110a which provide a long focal length, and forms an image on an image surface 400 that is a position of the light receiving sections 160. The light beam from the position P2 passes through a second optical surface and a pupil region 122b of the lens 110a which provide a middle focal length and forms an image on the image surface 400. The light beam from the position P1 passes through a first optical surface and a pupil region 122c of the lens 110a which provide a short focal length and forms an image on the image surface 400.

Accordingly, the imaging apparatus 10 can generate a focus image of an object which is positioned within any one of: a depth of field of the lens system 100 with respect to the luminous flux passing through the pupil region 122a; a depth of field of the lens system 100 with respect to the luminous flux passing through the pupil region 122b; and a depth of field of the lens system 100 with respect to the luminous flux passing through the pupil region 122c. When a front end of the depth of field of the lens system 100 with respect to the luminous flux passing through the pupil region 122b is present closer to the imaging apparatus 10 side than a rear end of the depth of field of the lens system 100 with respect to the luminous flux passing through the pupil region 122c, and the front end of the depth of field of the lens system 100 with respect to the luminous flux passing through the pupil region 122a is present closer to the imaging apparatus 10 side than the rear end of the depth of field of the lens system 100 with respect to the luminous flux passing through the pupil region 122b, the imaging apparatus 10 can generate a focus image of an object that is present in the range between the front end of the depth of field with respect to the position P1 and the rear end of the depth of field with respect to the position P3. Therefore, according to the lens system 100 and the optical device 115, an effectual depth of field can be expanded.

Figure 5:
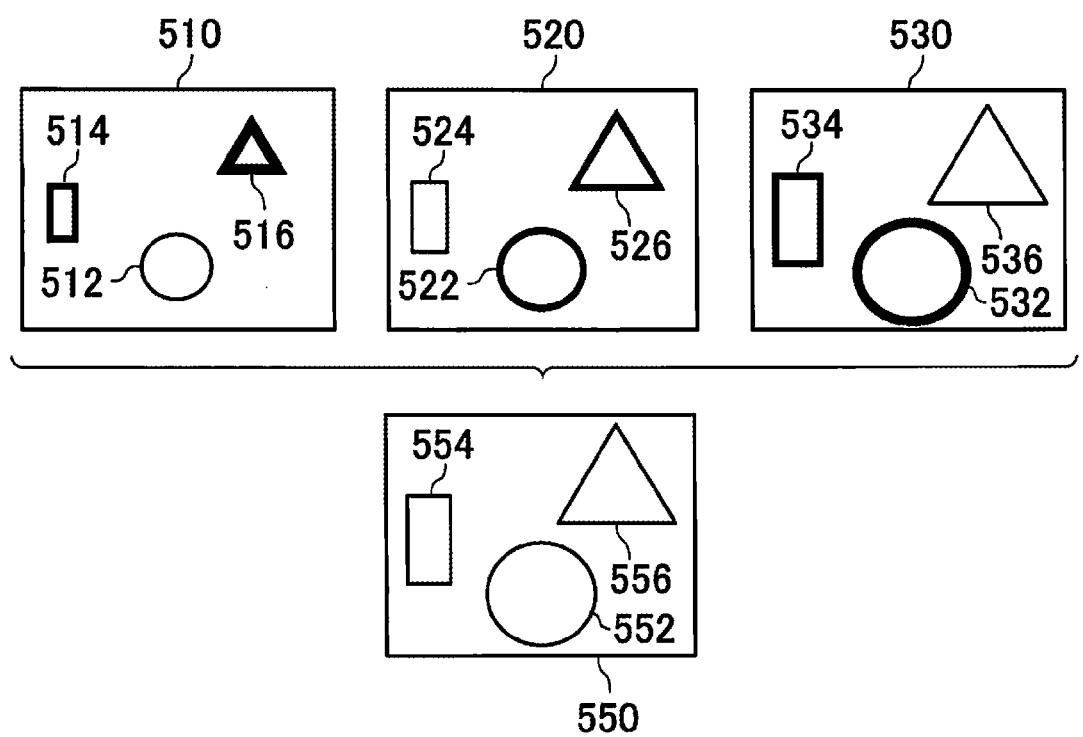
FIG. 5 is a view schematically showing one example of processing that generates a synthesized image 550 with an expanded depth of field.

FIG. 5 schematically shows one example of the processing that generates a synthesized image 550. A short focus image 510, a middle focus image 520, and a long focus image 530, which are one example of the images with different focal lengths generated by the image generation section 170, are images formed by light beams that passed through the first optical surface for a short focal length, the second optical surface for a middle focal length, and the third optical surface for a long focal length, respectively.

The short focus image 510 includes a short-distance object image 512 that is an image of a short-distance object present at the position P1 having a short distance from the imaging apparatus 10, a middle-distance object image 514 that is an image of a middle-distance object present at the position P2 having a middle distance from the imaging apparatus 10, and a long-distance object image 516 that is an image of a long-distance object present at the position P3 having a long distance from the imaging apparatus 10. The first optical surface for the short focal length can image an object light beam from the short-distance position P1 on the light receiving section 160. Accordingly, the short-distance object image 512 is the clearest image among the short-distance object image 512, the middle-distance object image 514, and the long-distance object image 516.

The middle focus image 520 includes a short-distance object image 522 that is an image of a short-distance object, a middle-distance object image 524 that is an image of a middle-distance object, and a long-distance object image 526 that is an image of a long-distance object. The second optical surface for the middle focal length can image an object light beam from the middle-distance position P2 on the light receiving section 160. Accordingly, the middle-distance object image 524 is the clearest image among the short-distance object image 522, the middle-distance object image 524, and the long-distance object image 526.

The long focus image 530 includes a short-distance object image 532 that is an image of a short-distance object, a middle-distance object image 534 that is an image of a middle-distance object, and a long-distance object image 536 that is an image of a long-distance object. The third optical surface for the long focal length can image an object light beam from the long-distance position P3 on the light receiving section 160. Accordingly, the long-distance object image 536 is the clearest image among the short-distance object image 532, the middle-distance object image 534, and the long-distance object image 536. It is to be noted that clearness of object images was expressed by thinness of lines in this drawing.

The image generation section 170 generates the synthesized image 550 by using the short-distance object image 512, the middle-distance object image 524, and the long-distance object image 536. As a result, it becomes possible to generate the synthesized image 550 that includes the short-distance object image 552, the middle-distance object image 554, and the long-distance object image 556, each of which is a clear image. Accordingly, the synthesized image 550 with an expanded depth of field can be provided. It is to be noted that the long focus image 530 formed through the third optical surface that is for the longest focal length is the highest magnification image among the short focus image 510, the middle focus image 520, and the long focus image 530. The image generation section 170 corrects the magnification of each object image corresponding to the focal length of each optical surface before synthesis. The image generation section 170 may correct the magnification of the short-distance object image 512 and the middle-distance object image 524 according to the magnification of the long focus image 530, and may synthesize them with the long focus image 530.

Thus, the image generation section 170 selects, for generation of the image of the object, any one of the pupil regions 122 in the exit pupil 120 through which a light beam passes and generates an image of the object with use of imaging signals of a plurality of the light receiving elements 162 that receive the object light beam that passed through the selected pupil region. In the case of selecting, for generation of the image of the object, any one of the pupil regions 122 in the exit pupil 120 through which an object light beam passes, the image generation section 170 may select, based on an object distance and focal lengths each corresponding to a plurality of the pupil regions 122 of the exit pupil 120, a pupil region 122 through which an object light beam that forms an image at the position of the light receiving section 160 passes. The image generation section 170 may select two or more pupil regions 122. More specifically, the image generation section 170 selects, based on a range of the object distance and focal lengths each corresponding to a plurality of the pupil regions 122, at least one of the pupil regions 122 through which the object light beam that forms an image at the position of the light receiving section 160 passes.

Figure 6:
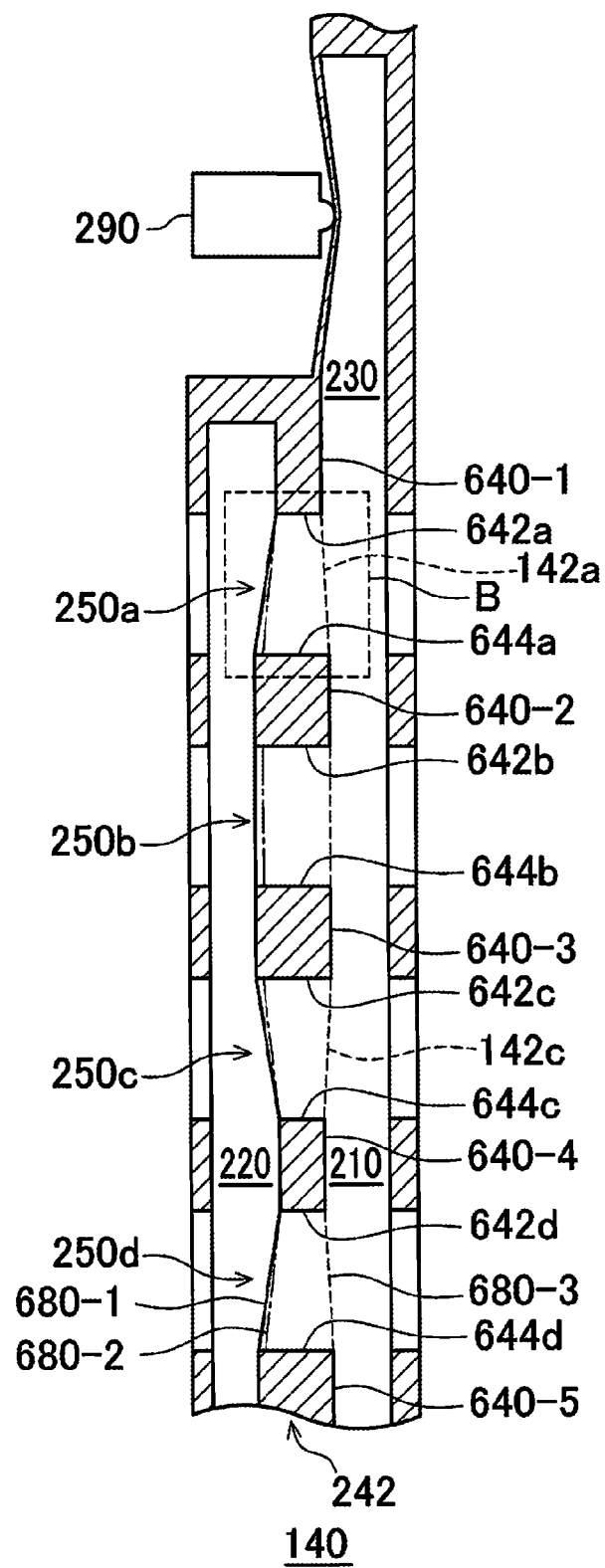
FIG. 6 is a view schematically showing another example of the configuration of the deflection section 140.

FIG. 6 is a view schematically showing another example of the configuration of the deflection section 140. The deflection section 140 shown in FIG. 2 is capable of taking images with the luminous flux that passes through three different pupil regions in the exit pupil 120 in the first state, and is capable of taking images with the luminous flux that passes through one pupil region in the exit pupil 120 in the second state. The deflection section 140 of this example is configured to have three states as the state of the fluid interfaces and to be able to take images, in each of these states, with the luminous flux passing through three different pupil regions. Particularly, the surface shapes of the divider plate 242 on the first fluid side and the second fluid side and the configuration of the lateral surface portions forming the through hole 250 are different from those of the divider plate 242 shown in FIG. 2. A description is herein given with a focus on the difference.

The through hole 250a of this example is formed from a lateral surface portion 642a with the first thickness included in a divider section 640-1, and a lateral surface portion 644a with a fourth thickness included in a divider section 640-2. The fourth thickness is assumed to be larger than the second thickness. In the through hole 250a of this example, an interface formed by connecting endpoints of both the lateral surface portions on the second fluid side has the same prism angle as the interface of the through hole 250a formed on the second fluid side shown in FIG. 2. Therefore, the prism element formed from this interface limits the light beams to be received by the light receiving element 162a to those that passed through the pupil region 122a. As shown with a broken line in this drawing, an interface formed by connecting endpoints of both the lateral surface portions on the first fluid side in the through hole 250a of this example has a prism angle inclined from a plane vertical to the optical axis. The prism element 142a having this prism angle limits the light beams to be received by the light receiving element 162a to those that passed through a pupil region in the exit pupil 120 that is between a region in the vicinity of the optical axis and the pupil region 122c.

The through hole 250b of this example is formed from a lateral surface portion 642b with the fourth thickness included in a divider section 640-2, and a lateral surface portion 644b with a fourth thickness included in a divider section 640-3. The divider section 640-2 and the divider section 640-3 position at the same position in the optical axis direction. Accordingly, an interface vertical to the optical axis is formed on both the endpoint on the second fluid side and the endpoint on the first fluid side. Therefore, the interface formed in the through hole 250b limits the light beams to be received by the light receiving section 160b to those that passed through the region in the vicinity of the optical axis in the exit pupil 120.

The through hole 250c of this example is formed from a lateral surface portion 642c with the fourth thickness included in the divider section 640-3, and a lateral surface portion 644b with the first thickness included in a divider section 640-4. In the through hole 250c of this example, an interface formed by connecting endpoints of both the lateral surface portions on the second fluid side has the same prism angle as the interface of the through hole 250c formed on the second fluid side shown in FIG. 2. Therefore, the prism element formed from this interface limits the light beams to be received by the light receiving element 162c to those that passed through the pupil region 122c. As shown with a broken line in this drawing, in the through hole 250c of this example, an interface formed by connecting endpoints of both the lateral surface portions on the first fluid side has a prism angle inclined from the plane vertical to the optical axis. The prism element 142c having this prism angle limits the light beams to be received by the light receiving element 162c to those that passed through a pupil region in the exit pupil 120 that is between the region in the vicinity of the optical axis and the pupil region 122a.

The through hole 250d is formed from a lateral surface portion 642d with the first thickness included in the divider section 640-3, and a lateral surface portion 644d with the fourth thickness included in a divider section 640-5. The divider section 640-5 is the same member as the divider section 640-2. Accordingly, the prism element formed in the through hole 250d is similar to the prism element formed in the through hole 250a, and therefore a description thereof is omitted.

Moreover, according to the divider plate 242 of this example, a prism element shown with a dashed dotted line in this drawing, such as a prism element 680-2, is formed. The prism element shown with a dashed dotted line has a prism angle whose inclination is smaller than that of the prism angle shown with a solid line as in a prism element 680-1 and is larger than that of the prism angle shown with a broken line as in a prism element 680-3. A configuration for stably retaining the prism elements shown with a dashed dotted line in this drawing is described in reference to FIG. 7.

By controlling the internal pressure of the fluid region 210, the control section 180 can control the inclination of the fluid interface so as to be in any one of the states that are shown with a solid line, a broken line, and a dashed dotted line in this example. More particularly, when the light receiving elements 162 are made to receive an object light beam 130 that passed through a pupil region 122 in the exit pupil 120 which does not include the optical axis, the control section 180 controls so that the fluid interface is inclined with respect to the optical axis at a first inclination angle, whereas when the light receiving elements 162 are made to receive an object light beam 130 that passed through another pupil region 122 in the exit pupil 120 which does not include the optical axis, the control section 180 controls so that the fluid interface is inclined with respect to the optical axis at a second inclination angle.

According to the deflection section 140 of this example, fluid interface can be controlled in three states as shown with a solid line, a dashed dotted line, and a broken line in this drawing. This makes it possible to take images with different combinations of prism angles. The depth of fields obtained with the fluid interface being in these three states is described in reference to FIG. 8.

Figure 7:
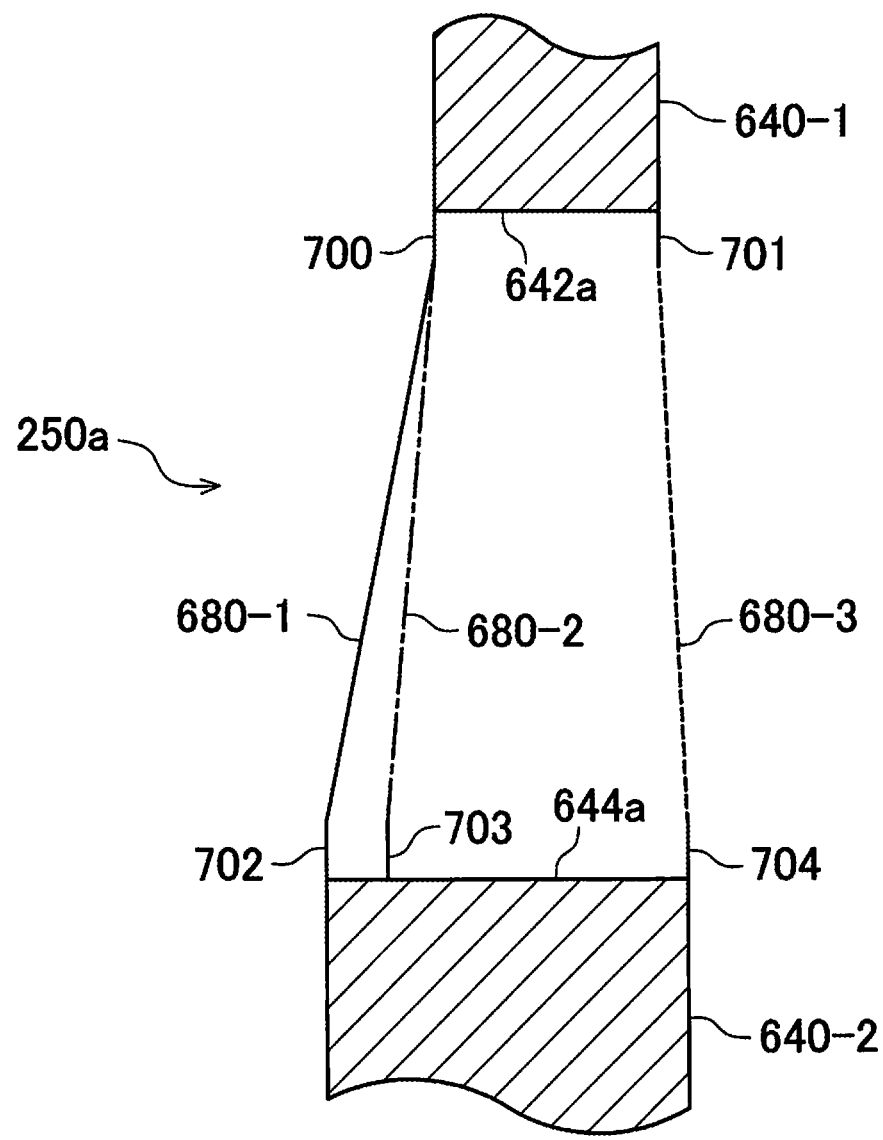
FIG. 7 is a view showing a modified example of a divider plate 242.

FIG. 7 shows a modified example of the divider plate 242. The modified example of the divider plate 242 is described by taking up the divider plate 242 shown in FIG. 6, and a part B in FIG. 6 in particular.

There are formed in the lateral surface portion 642a a protruding portion 700 and a protruding portion 701 which protrude toward the inside of the through hole 250a. There are formed in the lateral surface portion 644a a protruding portion 702, a protruding portion 703, and a protruding portion 704 which protrude toward the inside of the through hole 250a. All the protruding portions have a thickness large enough to trap the fluid interface. The protruding portion 703 is positioned closer to the fluid region 220 than the protruding portion 700 in the optical axis direction.

In the first state, an interface is formed between a top end of the protruding portion 700 that is an end portion on the fluid region 220 side and a top end of the protruding portion 702 that is an end portion on the fluid region 220 side, and this serves as the prism element 680-1. In the second state, an interface is formed between a top end of the protruding portion 701 that is an end portion on the fluid region 210 side, and a top end of the protruding portion 704 that is an end portion on the fluid region 210 side, and this serves as the prism element 680-3. In the third state, an interface is formed between the top end of the protruding portion 700 that is an end portion on the fluid region 220 side and a top end of the protruding portion 703 of the lateral surface portion 644a, and this serves as the prism element 680-2.

According to the present example, the lateral surface portion 642a and the lateral surface portion 644a have protruding portions, so that the fluid interface is easily trapped by the top ends of these protruding portions. This makes it possible to stably control the prism angles.

In this example, the part B in FIG. 6 was taken up and the protruding portions formed in the through hole 250a was described. It should naturally be understood that the protruding portions may be formed at intended positions in all the through holes 250 that are included in the divider plate 242 so as to trap the interface and the protruding portions may also be formed at intended positions in the through holes 250 of the divider plate 242 described with reference to FIGS. 1 through 6 so as to trap the interface.

Figure 8:
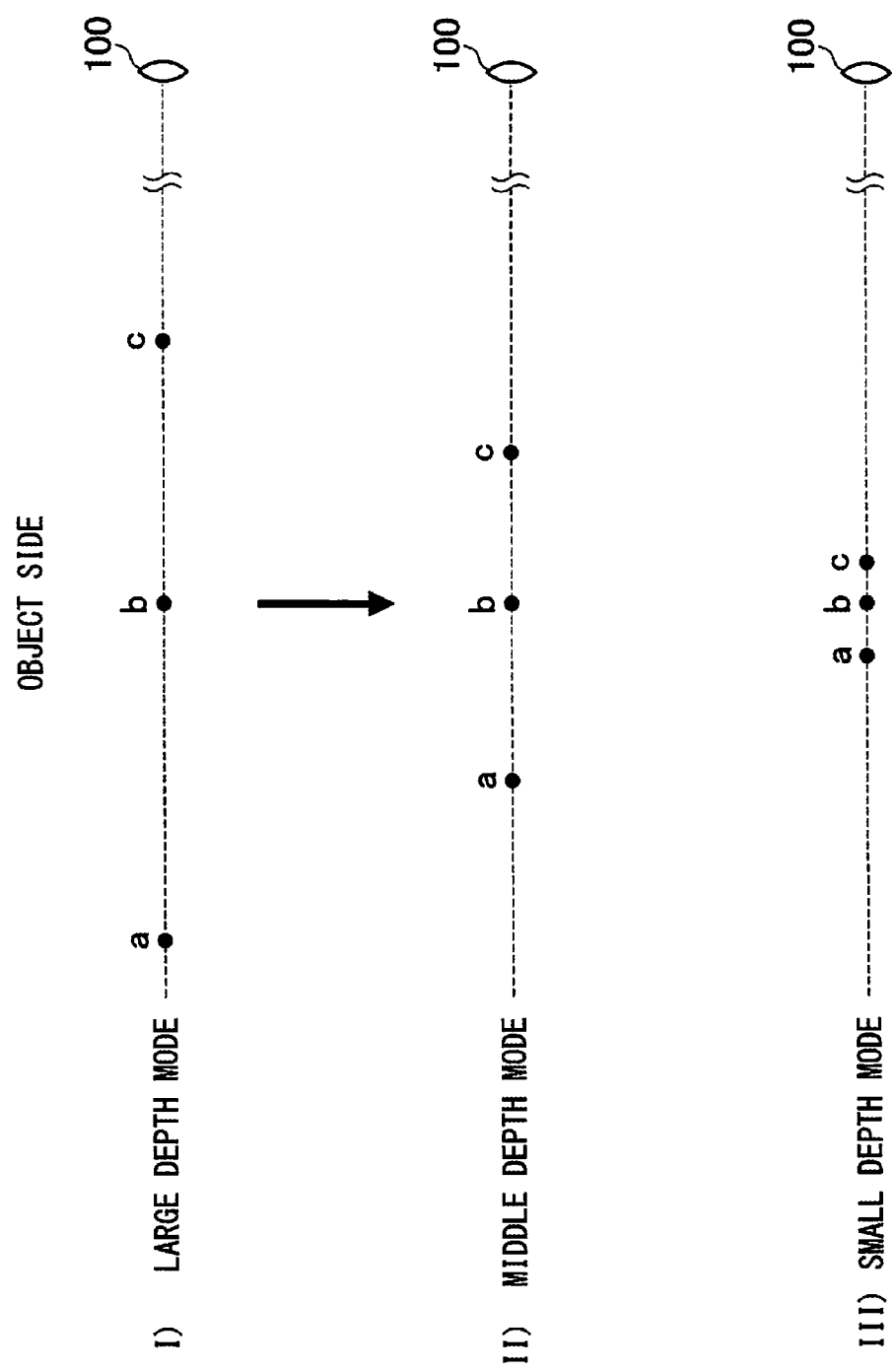
FIG. 8 is a view schematically showing one example of object positions which enable image formation in each of three states of the prism elements 142.

FIG. 8 schematically shows one example of object positions which enable image formation in each of three states of the prism elements 142. Focal lengths of the luminous flux that the light receiving elements 162 can receive are determined by the interfaces formed in the through hole 250a, the through hole 250b, and the through hole 250c, and object positions that enable image formation on the light receiving section 160 are determined thereby. Accordingly, in this drawing, the object positions that enable image formation are denoted with suffixes added to the reference characters of the through holes 250.

Under the control of the control section 180, the imaging apparatus 10 uses, as imaging modes different in depth of field, three states of the prism elements 142 described in reference to FIGS. 6 and 7 for imaging. More specifically, the three states are used as a large depth mode, a middle depth mode, and a small depth mode. As stated in reference to FIG. 6, according to the interface formed in the through hole 250b, an object image is formed in all the states by the luminous flux that passed through a pupil region around the optical axis.

Therefore, the object positions that enable image formation do not change in any of the modes.

The large depth mode corresponds to the state where the interfaces shown with a solid line in FIG. 6 are formed. The interfaces formed in the through hole 250a and the through hole 250c have a prism angle whose inclination is relatively large. Therefore, according to the prism element formed in the through hole 250a, an object light beam from a relatively distant object position a is imaged on the light receiving section 160. Moreover, according to the prism element formed in the through hole 250c, an object light beam from a relatively close object position c is imaged on the light receiving section 160.

The middle depth mode corresponds to the state where the interfaces shown with a dashed dotted line in FIG. 6 are formed. The interfaces formed in the through hole 250a and the through hole 250c have a prism angle whose inclination is smaller than that of the large depth mode. Therefore, the object position a is positioned closer to the imaging apparatus 10 than the object position a in the large depth mode. Moreover, an object position c is positioned more distant than the object position c in the large depth mode.

The small depth mode corresponds to the state where the interfaces shown with a dotted line in FIG. 6 are formed. The interfaces formed in the through hole 250a and the through hole 250c have a prism angle whose inclination is inverted and is further smaller than that of the middle depth mode. Therefore, the object position c is positioned closer to the imaging apparatus 10 than the object position a in the middle depth mode. Moreover, an object position a is positioned more distant than the object position c in the large depth mode.

Accordingly, when objects are present in a relatively large distance range, the imaging apparatus 10 takes images in the large depth mode and performs synthesizing processing shown in FIG. 5, so that a clear object image can be acquired. Contrary to this, when objects are concentrated in a small distance range, the imaging apparatus 10 takes images in the small depth mode and performs synthesizing processing shown in FIG. 5, so that a clear object image can be acquired. When objects are determined to be present in a certain distance range, the imaging apparatus 10 takes images in the middle depth mode and performs synthesizing processing shown in FIG. 5, so that a clear object image can be acquired. The imaging apparatus 10 can select any one of the imaging modes based on a distance to an object which needs to be resolved. The imaging apparatus 10 may select any one of the imaging modes based on an instruction from a user of the imaging apparatus 10, and may select any one of the imaging modes based on distance-measurement information on the object.

The imaging apparatus 10 may also take images a plurality of times by switching a plurality of the modes out of the large depth mode, the middle depth mode, and the small depth mode. The imaging apparatus 10 may select most focused object images, out of a plurality of images obtained by switching the modes, and may synthesize them as shown in FIG. 5. This makes it possible to provide object images focused by minute distance resolution.

Thus, the control section 180 selects a combination of the pupil regions 122, based on an object distance and focal lengths possessed by the lens 110a, so as to make the light receiving section 160 receive an object light beam that forms an image on the light receiving section 160. More specifically, the control section 180 controls inclinations of the prism interfaces based on an object distance so as to direct the direction of the luminous flux to be received by the corresponding light receiving elements 162 toward the pupil region 122 through which an object light beam that forms an image at the position of the light receiving section 160 passes. As shown in this drawing, the control section 180 can control which light beam, among light beams passing through respective pupil regions 122, is used for imaging based on a distance range where an object is present and the focal lengths possessed by the lens 110a.

Figure 9:
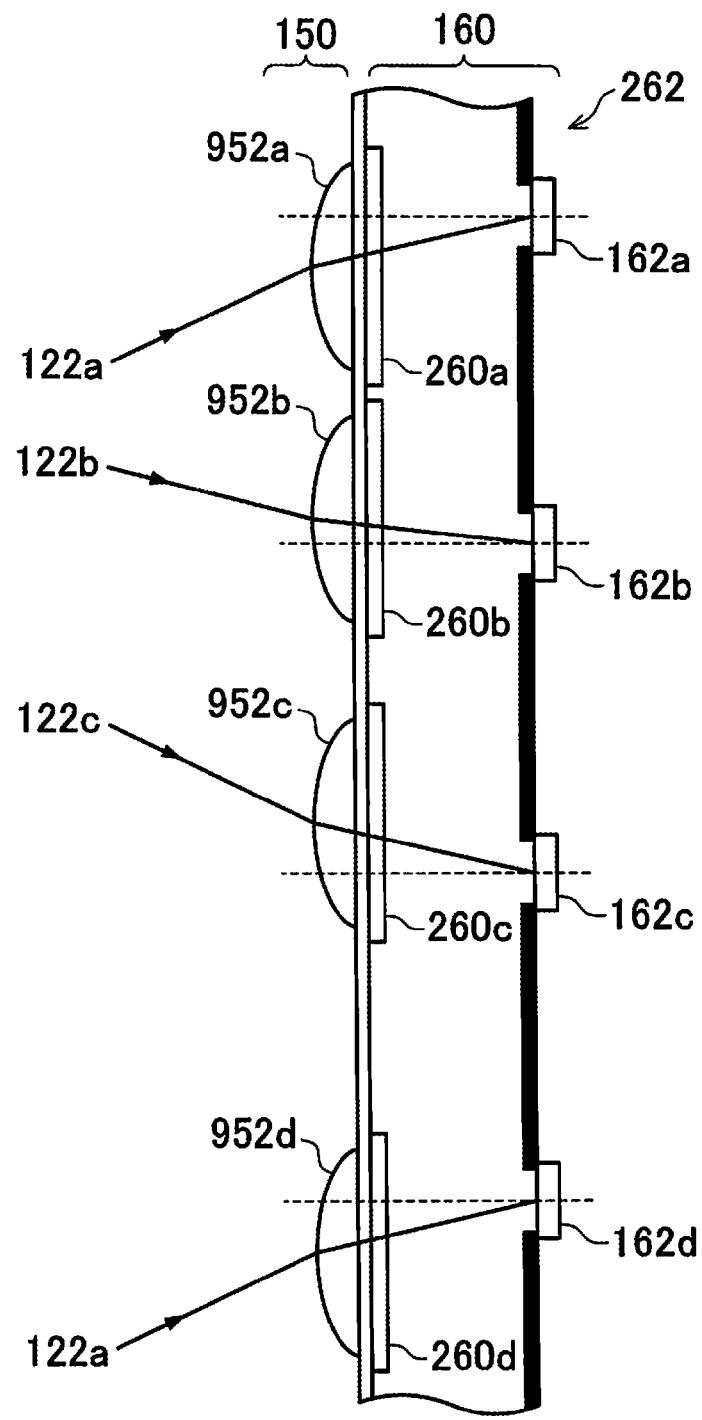
FIG. 9 is a view schematically showing one example of a light receiving unit including other deflection optical elements.

FIG. 9 schematically shows one example of a light receiving unit 20 including other deflection optical elements. The light receiving unit 20 of this example includes a microlens section 150 and a light receiving section 160. The microlens section 150 includes a plurality of microlenses 952. The light receiving section 160 includes a plurality of color filters 260, a plurality of light receiving elements 162, and a light-shielding section 262. The light receiving unit 20 of this example has the microlenses 952 as the deflection optical elements in place of the prism elements 142 as the deflection optical elements described in FIGS. 1 through 8. A description is herein given with a focus on the difference from the light receiving unit 20 described in FIGS. 1 through 8.

Light beams that passed through generally the entire surface of the exit pupil 120 come incident into the microlenses 952. In this example, the microlenses 952 also have refractive power large enough to make the respective light receiving elements 162 receive a light beam that passed through a partial region of the exit pupil 120. Therefore, the size of the luminous flux that can be received by the light receiving elements 162 is limited to the luminous flux that passes through the partial range of the exit pupil 120. In the light receiving unit 20 of this example, an optical axis of the microlens 952 is provided so as to be deflected with respect to the center position of the light receiving element 162 inside a plane vertical to the optical axis of the lens system 100. The center position of the light receiving element 162 is defined as the center position of a region through which a light beam, which can be received by the light receiving element 162 and used for photoelectric conversion, passes. In this example, the center position of the light receiving element 162 may be the center of a light receiving opening formed in the light-shielding section 262 positioned in the vicinity of the light receiving element 162.

Each deviated amount of the microlenses 952 is designed so that a light beam that passed through a predetermined pupil region 122 is received by corresponding light receiving elements 162. With the refractive power and deflection of the microlenses 952, the luminous flux that the light receiving elements 162 can receive is limited to the luminous flux that passed through a partial region of the exit pupil 120. In this example, the microlens 952a limits the light beams, which can be received by the light receiving element 162a through light receiving openings, to those that passed through the pupil region 122a. Similarly, the microlenses 952b and 952c limit the light beams, which can be received by the corresponding light receiving elements 162b and 162c through light receiving openings, to those that respectively passed through the pupil regions 122b and 122c. The microlens 952d, like the microlens 952a, limits the light beams, which can be received by the light receiving elements 162d through light receiving openings, to those that passed through the pupil region 122a. Thus, a plurality of the microlenses 952 are provided with their optical axes deflected with respect to the light receiving openings of the light receiving elements 162, so that the object light beams that passed through predetermined pupil regions 122 are received by each of the corresponding light receiving elements 162.

It suffices that the microlens 152 or the microlens 952 described in FIGS. 1 through 9 can limit the width of the pupil to such an extent that a difference in focal length is negligible. Therefore, the control section 180 may control the refractive power of the microlens 152 so as to limit the width of the pupil to such an extent that a difference in focal length is negligible. In this case, the control section 180 may control the refractive power of the microlens 152 so that the width of the pupil is different for every focal length.

Figure 10:
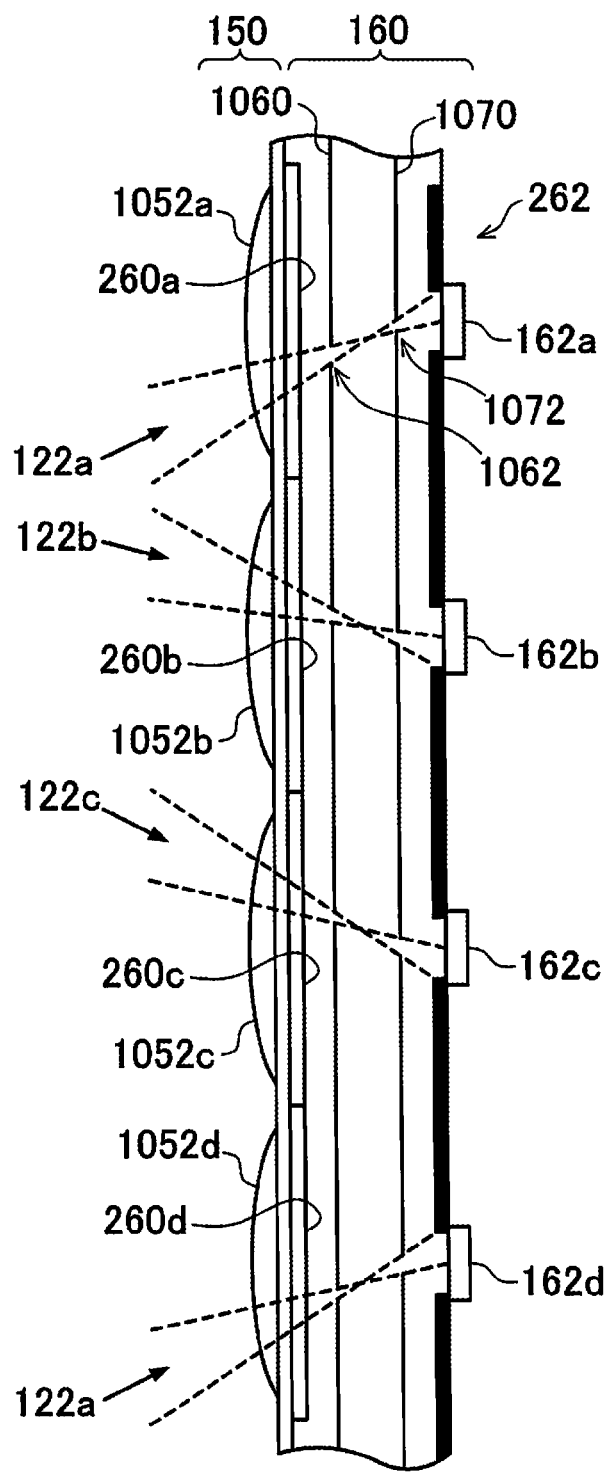
FIG. 10 is a view schematically showing one example of the light receiving unit including other deflection optical elements.

FIG. 10 schematically shows one example of a light receiving unit including other deflection optical elements. The light receiving unit 20 of this example has a microlens section 150 and a light receiving section 160. The microlens section 150 includes a plurality of microlenses 1052. The light receiving section 160 includes a plurality of color filters 260, a light-shielding section 1060, a light-shielding section 1070 a plurality of light receiving elements 162, and a light-shielding section 262. The light receiving unit 20 of this example has the light-shielding section 1060 and the light-shielding section 1070 as the deflection optical elements in place of the prism elements 142 as the deflection optical elements described in FIGS. 1 through 8. A description is herein given with a focus on the difference from the light receiving unit 20 described in FIGS. 1 through 8.

Light beams that passed through generally the entire surface of the exit pupil 120 come incident into the microlenses 1052. In this example, the microlenses 1052 have refractive power large enough to focus the light beams that passed through generally the entire surface of the exit pupil 120 toward the light receiving elements 162. The refractive power possessed by the microlens 1052 may be smaller than the refractive power possessed by the microlens 152 or the microlens 952 described in reference to FIGS. 1 through 9. In the light receiving unit 20 of this example, an opening 1062 and an opening 1072 are each formed in the light-shielding section 1060 and the light-shielding section 1070. Out of the light beams focused by the microlens 1052 toward the light receiving element 162, a part of the light beams that passed through the opening 1062 and the opening 1072 comes incident into the light receiving element 162 through a light receiving opening formed in the light-shielding section 262.

The opening 1062 and the opening 1072 are provided so as to be deflected with respect to each other within a plane vertical to the optical axis of the lens system 100. Respective positions of the opening 1062 and the opening 1072 are designed so that a light beam that passed through a predetermined pupil region 122 is received by corresponding light receiving elements 162. With the deflection of the opening 1062 and the opening 1072, the luminous flux that the light receiving elements 162 can receive is limited to the luminous flax that passed through a partial region of the exit pupil 120. In this example, the opening 1062 and the opening 1072 limit the light beams, which can be received by the light receiving element 162a through a light receiving opening, to those that passed through the pupil region 122a. Since the openings corresponding to the light receiving elements 162b-162d are similar, a description thereof is omitted. Thus, the light-shielding section 1060 and the light-shielding section 1070 have the openings, which have directivity to the predetermined pupil regions 122, for the corresponding light receiving elements 162.

The light-shielding section 262, in place of the light-shielding section 1060 and the light-shielding section 1070, may have openings which have directivity to the predetermined pupil regions 122 for the corresponding light receiving elements 162.

Figure 11:
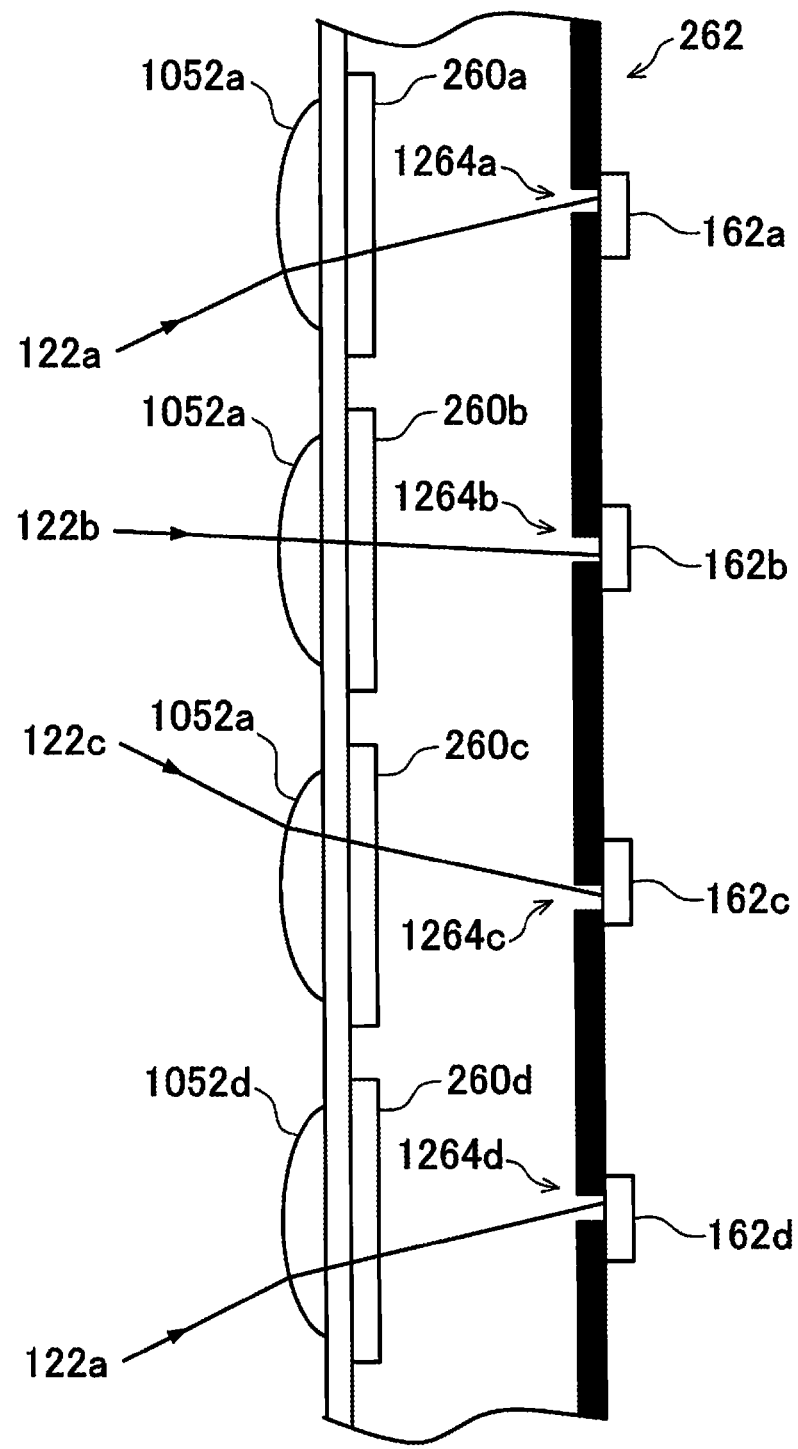
FIG. 11 is a view schematically showing one example of the light receiving unit including other deflection optical elements.

FIG. 11 schematically shows one example of a light receiving unit of this example. The light receiving unit 20 of this example has openings 1264 of the light-shielding section 262 as the deflection optical elements in place of the prism elements 142 as the deflection optical elements described in FIGS. 1 through 8.

Light beams that passed through generally the entire surface of the exit pupil 120 come incident into the microlenses 1052. In this example, the microlenses 1052 have refractive power large enough to focus the light beams that passed through generally the entire surface of the exit pupil 120 toward the light receiving elements 162. The refractive power possessed by the microlens 1052 may be smaller than the refractive power possessed by the microlens 152 or the microlens 952 described in reference to FIGS. 1 through 9.

In the light receiving unit 20 of this example, the opening 1264 of the light-shielding section 262 is provided so as to be deflected with respect to the center position of the light receiving element 162 within a plane vertical to the optical axis of the lens system 100. Here, the center position of the light receiving element 162 is defined as the center position of a region through which a light beam, which can be received by the light receiving elements 162 and used for photoelectric conversion, passes.

Each deviated amount of the opening 1264 is designed so that a light beam that passed through a predetermined pupil region 122 is received by corresponding light receiving elements 162. With the deflection of the opening 1264, the luminous flux that the light receiving elements 162 can receive is limited to the luminous flux that passed through a partial region of the exit pupil 120. In this example, an opening 1264a limits the light beams, which can be received by the light receiving element 162a, to those that passed through the pupil region 122a. Similarly, openings 1264b and 1264c limit the light beams, which can be received by the corresponding light receiving elements 162b and 162c, to those that respectively passed through the pupil regions 122b and 122c. An opening 1264d, like the opening 1264a, limits the light beams, which can be received by the light receiving element 162d, to those that passed through the pupil region 122a. Thus, a plurality of the openings 1264 of the light-shielding section 262 are provided so as to be deflected with respect to the center position of the light receiving elements 162, so that each of the object light beams that passed through predetermined pupil regions 122 is received by each of the corresponding light receiving elements 162.

Thus, the light-shielding section 262 has the openings, which have directivity to the predetermined pupil regions 122, for the corresponding light receiving elements 162.

Figure 12:
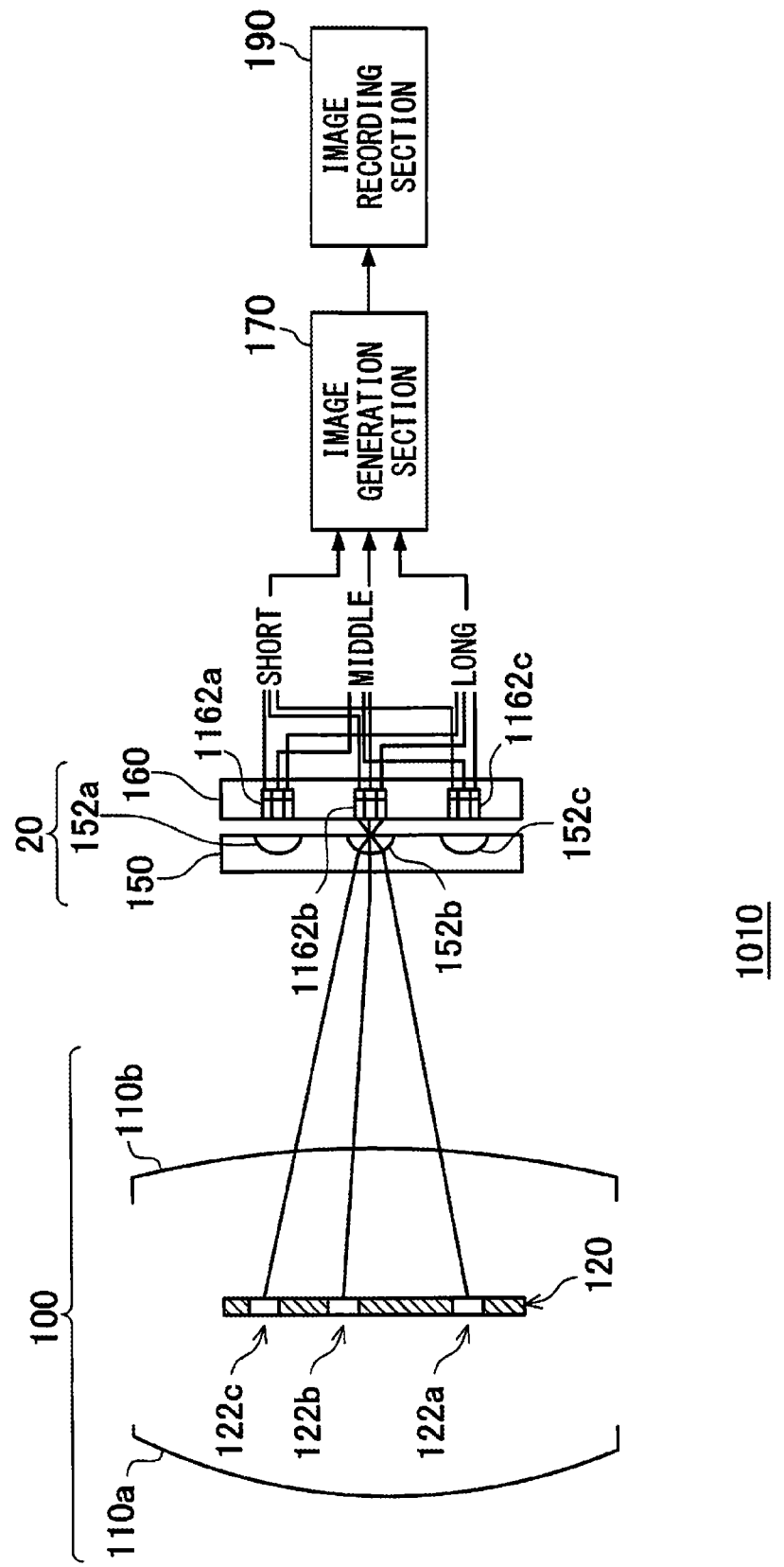
FIG. 12 is a view showing one example of another block configuration of an imaging apparatus 1010.

FIG. 12 schematically shows one example of another block configuration of an imaging apparatus 1010. The imaging apparatus 1010 in this example includes a lens system 100, a light receiving unit 20, an image generation section 170, and an image recording section 190.

The lens system 100, which has the same configuration as the lens system 100 described in FIGS. 1 through 8, has a lens system 100a that is, for example, a progressive refraction lens.

A light receiving unit 20 of this example has a microlens section 150 and a light receiving section 160. The light receiving unit 20 of this example has deflection optical elements in the light receiving section 160 in place of the deflection section 140 described in FIGS. 1 through 8. The microlens section 150 has a plurality of microlenses 152 and also light receiving element groups 1162 each provided corresponding to one microlens 152 as deflection optical elements. More specifically, a light receiving element group 1162a is provided corresponding to the microlens 152a, a light receiving element group 1162b is provided corresponding to the microlens 152b, and a light receiving element group 1162c is provided corresponding to the microlens 152c.

Figure 13:
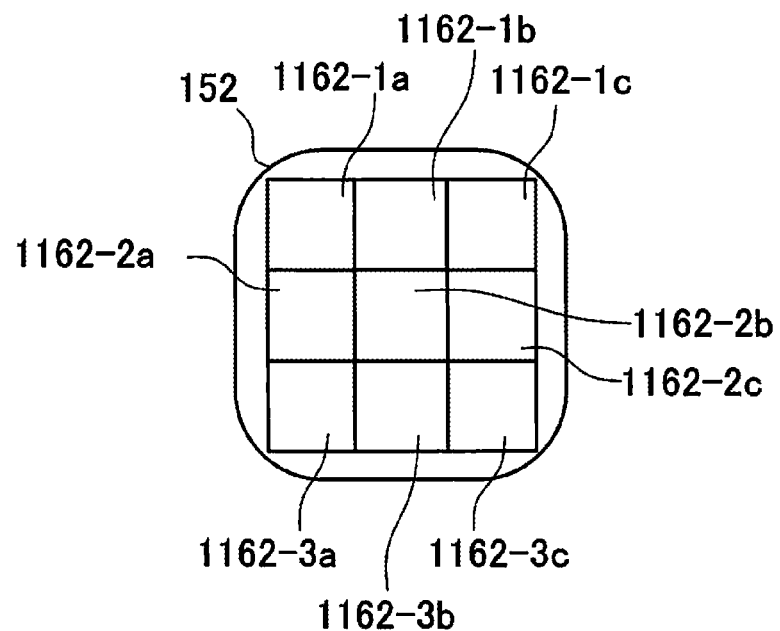

FIG. 13 is a schematic view showing one example of the microlens 152 as viewed from the lens system 100 side and the light receiving element groups 1162 provided corresponding to the microlens 152. As shown in the drawing, one light receiving element group 1162 is provided corresponding to one microlens 152. The light receiving element groups 1162 is constituted of nine light receiving elements 1162-1a, 1b, 1c, 1162-2a, 2b, 2c, and 1162-3a, 3b, 3c.

It is to be noted that the number of the light receiving elements constituting one light receiving element group is not limited to nine, but may properly be determined. Thus, one microlens 152 is provided for each of a plurality of the light receiving elements. The microlens 152 has refractive power large enough to make the corresponding light receiving elements 1162-1a to 1162-3c receive light beams that passed through respective regions of the exit pupil 120.

Figure 14:
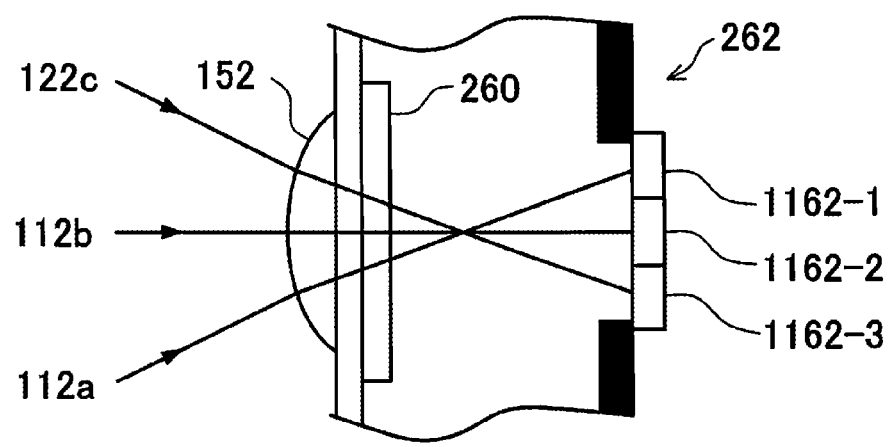
FIG. 14 is a schematic enlarged view showing a light receiving unit of the imaging apparatus 1010.

FIG. 14 is a schematic enlarged view showing a light receiving unit of the imaging apparatus 1010. As shown in the drawing, a light beam that passed through the pupil region 122a in the exit pupil 120 of the lens system 100 is received by the light receiving elements 1162-1 (equivalent to the first light receiving elements) with the presence of the microlens 152.

A light beam that passed through the pupil region 122b is received by the light receiving elements 1162-2 (equivalent to the second light receiving elements) with the presence of the microlens 152.

Similarly, a light beam that passed through the pupil region 122c is received by the light receiving element 1162-3 with the presence of the microlens 152.

Thus, the microlens forms an image forming relation between the pupil of the progressive refraction lens and a plurality of light receiving cells, so that the light beams to be received by the respective light receiving elements are limited to those that passed through predetermined pupil regions 122 in the exit pupil 120 of the lens 110.

Each light receiving element in the light receiving element group 1162 outputs an imaging signal with the strength corresponding to a light receiving amount to the image generation section 170. The image generation section 170 generates an image of an object from the imaging signals of a plurality of the light receiving element groups 1162. More specifically, the image generation section 170 generates image signals indicating images with different focal lengths based on the imaging signals fed from the light receiving element groups 1162. In this example, the light beams that each light receiving element 1162-1, 1162-2 and 1162-3 of the light receiving element group 1162 can receive are limited to those that passed through each of the pupil regions 122a-122c. Therefore, the image generation section 170 generates signals of an image with the first focal length based on imaging signals from the light receiving element 1162-1 that receives a light beam that passed through the pupil region 122a. The image generation section 170 also generates signals of an image with the second focal length based on imaging signals from the light receiving element 1162-2 that receives a light beam that passed through the pupil region 122b. The image generation section 170 also generates signals of an image with the third focal length based on imaging signals from the light receiving element 1162-3 that receives a light beam that passed through the pupil region 122c.

In this example, there is shown an example in which light beams that passed through three regions in the exit pupil are made incident, by the microlenses, into three light receiving elements arrayed in a longitudinal direction. The three regions of the exit pupil directed by the microlenses correspond to image formation lens regions different in focal length. Accordingly, images with three different focal lengths can be obtained simultaneously, independently and parallely.

Figure 15:
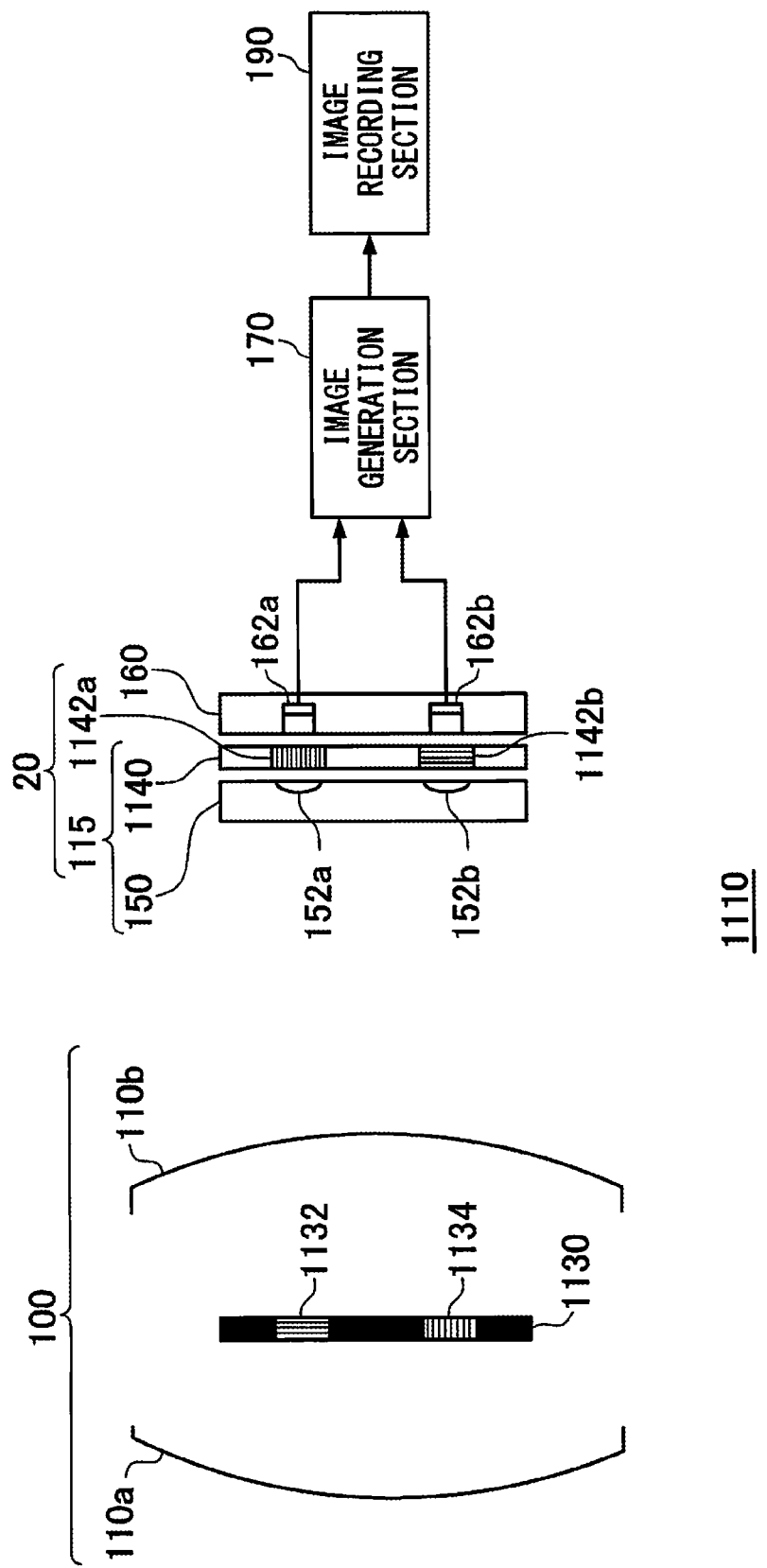
FIG. 15 is a view schematically showing one example of another block configuration of an imaging apparatus 1110.

FIG. 15 schematically shows one example of another block configuration of an imaging apparatus 1110. The imaging apparatus 1110 in this example includes a lens system 100, a light receiving unit 20, an image generation section 170, and an image recording section 190. The light receiving unit 20 has a microlens section 150, a polarizing filter section 1140, and a light receiving section 160. The light receiving unit 20 of this example has the polarizing filter section 1140 as the deflection optical element in place of the deflection section 140 described in FIGS. 1 through 8. Since the light receiving section 160 has the similar configuration to the light receiving section 160 described in FIGS. 1 through 8, a description thereof is omitted. A description is herein given with a focus on difference from the imaging apparatus 10 described in FIGS. 1 through 8.

In the imaging apparatus 1110 of this example, the lens system 100 has a lens 110 and a polarizing filter section 1130. The polarizing filter section 1130 is provided in the vicinity of the exit pupil. The polarizing filter section 1130 has a first polarizing filter 1132 and a second polarizing filter 1134 provided corresponding to different pupil regions in the exit pupil of the lens system 100. Light beams that passed through corresponding pupil regions come incident into the first polarizing filter 1132 and the second polarizing filter 1134. The first polarizing filter 1132 and the second polarizing filter 1134 selectively pass through polarization components that are orthogonal to each other. Examples of a combination of orthogonal polarization components include linearly polarization components whose polarization directions are orthogonal to each other. Examples of a combination of orthogonal polarization components also include a combination of a right-handed circularly polarization component and a left-handed circularly polarization component.

The microlens section 150 has a plurality of microlenses 152. In this example, the microlenses 152 have refractive power large enough to focus the light beams that passed through generally the entire surface of the exit pupil toward the light receiving elements 162. The refractive power possessed by the microlens 152 may be smaller than the refractive power possessed by the microlenses described in reference to FIGS. 1 through 9. The polarizing filter section 1140 has a plurality of polarizing filters 1142 provided corresponding to a plurality of the light receiving elements 162. Out of the polarizing filters 1142, a polarizing filter 1142a passes through a polarization component transmitted by the second polarizing filter 1134 and does not pass through a polarization component transmitted by the first polarizing filter 1132. Out of the polarizing filters 1142, a polarizing filter 1142b passes through the polarization component transmitted by the first polarizing filter 1132 and does not pass through a polarization component transmitted by the second polarizing filter 1134. The polarizing filter section 1140 has a plurality of pairs of the polarizing filter 1142a and the polarizing filter 1142b.

The light receiving elements 162 receive a light beam passed by corresponding polarizing filters 1142. More specifically, the light receiving element 162a receives the light beam passed by the polarizing filter 1142a. The light receiving element 162b receives the light beam passed by the polarizing filter 1142b. Therefore, the light beams to be received by the light receiving element 162a are limited to those that passed through the second polarizing filter 1134. The light beams to be received by the light receiving element 162b are limited to those that passed through the first polarizing filter 1132. Accordingly, the light receiving element 162a and the light receiving element 162b receive the light beams that passed through optical surfaces of the lens system 100 having focal lengths different from each other. The image generation section 170 generates an image with the first focal length from the light receiving elements 162, such as the light receiving element 162a, which received the light beam that passed through the second polarizing filters 1134. The image generation section 170 also generates an image with the second focal length from the light receiving elements 162, such as the light receiving element 162b, which received the light beam that passed through the first polarizing filters 1132. The imaging apparatus 1110 of this example can also take images with different focal lengths.

Thus, the imaging apparatus 1110 of this example has, in a plurality of numbers, the first polarizing filter 1132 and the second polarizing filter 1134 which transmit polarization components different from each other in a plurality of the pupil regions, and the polarizing filters 1142a and 1142b provided corresponding to a plurality of the light receiving elements 162 to respectively transmit different polarization components.

Figure 16:
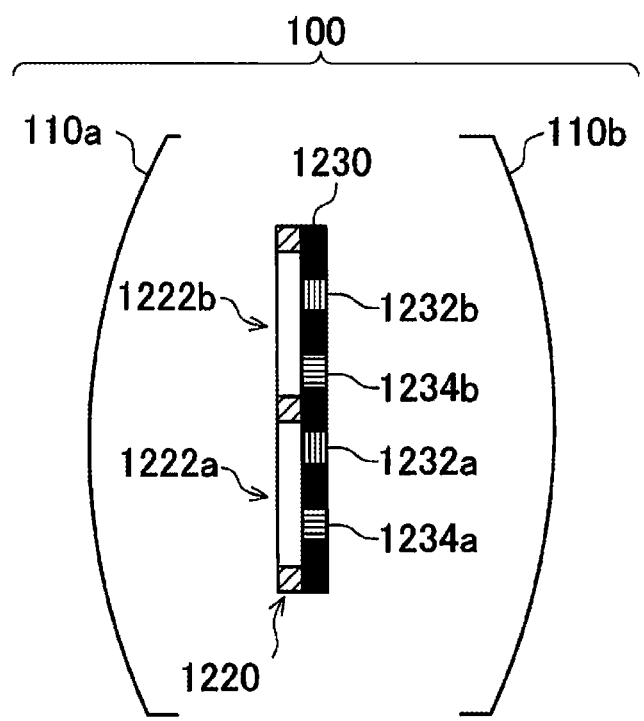
FIG. 16 is a view showing a modified example of the imaging apparatus 1110.

FIG. 16 shows a modified example of the imaging apparatus 1110. While the imaging apparatus 1110 shown in FIG. 15 can take images with two kinds of focal lengths, the imaging apparatus 1110 in this example is configured so that images can be taken with four kinds of focal lengths. A description is herein given of the configuration of the imaging apparatus 1110 of this example with a focus on difference in configuration of the lens system 100.

The lens system 100 has a polarizing filter section 1230, provided in the vicinity of an exit pupil 1220 of the lens system 100, in place of the polarizing filter section 1130 of FIG. 15. The polarizing filter section 1230 has a first polarizing filter 1232a, a first polarizing filter 1232b, a second polarizing filter 1234a, and a second polarizing filter 1234b.

The first polarizing filter 1232a and the second polarizing filter 1234a are provided corresponding to different regions in the pupil region 1222a in the exit pupil 1220. Light beams that passed through corresponding regions come incident into the first polarizing filter 1232a and the second polarizing filter 1234a. The first polarizing filter 1232a and the second polarizing filter 1234a selectively pass through polarization components that are orthogonal to each other.

The first polarizing filter 1232b and the second polarizing filter 1234b are provided corresponding to different regions in the pupil region 1222b in the exit pupil 1220. Light beams that passed through corresponding regions come incident into the first polarizing filter 1232b and the second polarizing filter 1234b. The first polarizing filter 1232b and the second polarizing filter 1234b selectively pass through polarization components that are orthogonal to each other.

The luminous flux that goes to the light receiving section 160 included in the imaging apparatus 1110 of this example is limited to the luminous flux that passed through either one of the pupil region 1222a and the pupil region 1222b. For example, as described in reference to FIGS. 1 through 8, the prism elements 142 and the microlenses 152 can limit the luminous flux that goes to the light receiving section 160. As described in reference to FIG. 9, the deflection of the microlenses 152 can also limit the luminous flux that goes to the light receiving section 160. As described in reference to FIG. 10, a light-shielding section can also limit the luminous flux that goes to the light receiving section 160. As described in reference to FIG. 14, in the light receiving section 160, a plurality of the light receiving elements in a light receiving element group 1162 provided corresponding to one microlens 152 can also limit the luminous flux incident into the light receiving section 160.

Out of the light receiving elements 162 that receive light beams that passed through the pupil region 1222a, the light receiving element 162 provided corresponding to the polarizing filter 1142a can receive the light beam that passed through the first polarizing filter 1232a. Therefore, the light beams to be received by the light receiving element 162 are limited to those that passed through the first polarizing filter 1232a. On the contrary, out of the light receiving elements 162 that receive light beams that passed through the pupil region 1222a, the light receiving elements 162 provided corresponding to the polarizing filter 1142b can receive the light beam that passed through the second polarizing filter 1234a. Therefore, the light beams to be received by the light receiving elements 162 are limited to those that passed through the second polarizing filter 1234a.

Moreover, out of the light receiving elements 162 that receive light beams that passed through the pupil region 1222b, the light receiving element 162 provided corresponding to the polarizing filter 1142a can receive the light beam that passed through the first polarizing filter 1232b. Therefore, the light beams to be received by the light receiving element 162 are limited to those that passed through the first polarizing filter 1232b. On the contrary, out of the light receiving elements 162 that receive light beams that passed through the pupil region 1222b, the light receiving element 162 provided corresponding to the polarizing filter 1142b can receive the light beam that passed through the second polarizing filter 1234b. Therefore, the light beams to be received by the light receiving element 162 are limited to those that passed through the second polarizing filter 1234b.

In this example, the pupil region is divided into two or more pupil regions, like the pupil region 1222a and the pupil region 1222b, by the deflection optical elements. Of the divided pupil regions, at least one pupil region is further divided by the polarizing filters. In short, the imaging apparatus 1110 can separately take images through three or more different pupil regions with the combination of deflection optical elements and polarizing filters. Accordingly, it becomes possible to take images with three or more different focal lengths.

While the configuration of dividing the pupil region with the polarizing filters was described in reference to FIGS. 15 and 16, wavelength filters can be used in place of the polarizing filters shown in FIGS. 15 and 16. More specifically, the imaging apparatus 1110 may have first wavelength filters adapted to transmit wavelength components different from each other in a plurality of the pupil regions, and second wavelength filters provided corresponding to a plurality of the light receiving elements 162 to respectively transmit different wavelength components. As the wavelength filters, two or more wavelength filters which respectively transmit light beams in two or more partial wavelength bands belonging to red wavelength bands, two or more wavelength filters which respectively transmit light beams in two or more partial wavelength bands belonging to green wavelength bands, and two or more wavelength filters which transmit light beams in two or more partial wavelength bands belonging to blue wavelength bands may be used. In this case, images of each focal length can be formed from light beams of three partial wavelength bands each selected out of the red wavelength bands, the green wavelength bands, and the blue wavelength bands. Thus, color images can be taken with the pupil regions being limited also by the wavelength filters.

Figure 17:
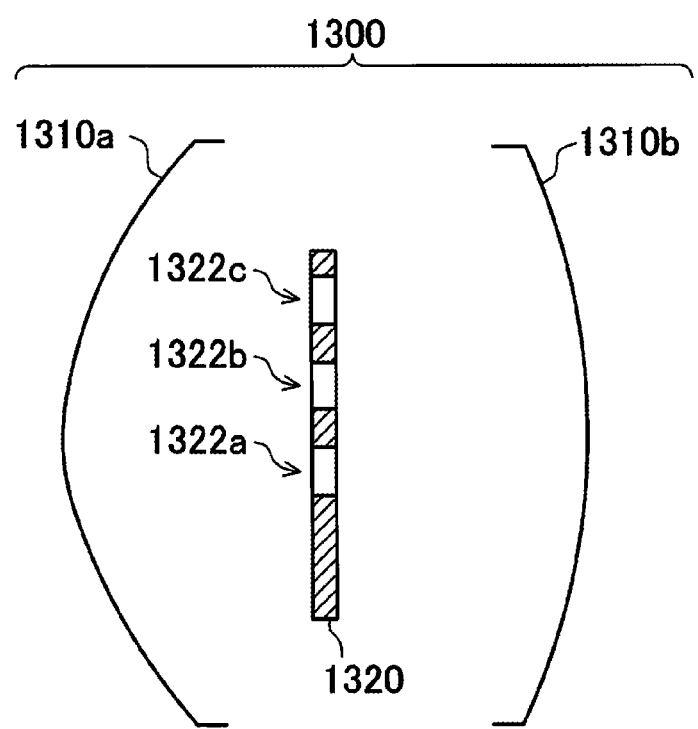
FIG. 17 is a view schematically showing another example of a lens system.

FIG. 17 is a view schematically showing another example of the lens system. This example shows another example of the lens system 100 described in reference to FIGS. 1 through 12. A lens 110a included in the lens system 100 is structured as an asymmetrical progressive refraction lens in one example. A lens 1310a included in a lens system 1300 of this example is a spherical aberration type (rotationally symmetrical) whose focal length is different corresponding to a distance from the optical axis but is equal on optical surfaces which are at an equal distance from the optical axis. The lens system 1300 has refractive power which is in a sense concentrically distributed. The lens system 1300 of this example has a short focal length at the center of the optical axis and has a longer focal length as going farther from the optical axis.

In the lens system 1300 of this example, object light beams to be received by the light receiving elements 162 are limited to those that passed through any one of pupil regions in an exit pupil 1320 of the lens system 1300, out of partial pupil regions 1322a-1322c positioned at different distances from the optical axis. The pupil region can be limited by deflection optical elements as described in reference to FIGS. 1 through 16. For example, as described in reference to FIGS. 1 through 8, the prism elements 142 and the microlenses 152 can limit the luminous flux that goes to the light receiving section 160. Moreover, as described in reference to FIG. 9, the deflection of the microlenses 152 can also limit the luminous flux that goes to the light receiving section 160. As described in reference to FIGS. 10 and 11, the light-shielding section can also limit the luminous flux that goes to the light receiving section 160. As described in reference to FIG. 14, in the light receiving section 160, a plurality of the light receiving elements in a light receiving element group 1162 provided corresponding to one microlens 152 can also limit the luminous flux incident into the light receiving section 160.

Light-shielding masks shown in FIG. 18 can also limit the luminous flux that was incident into the light receiving sections 160.

Figure 18A:
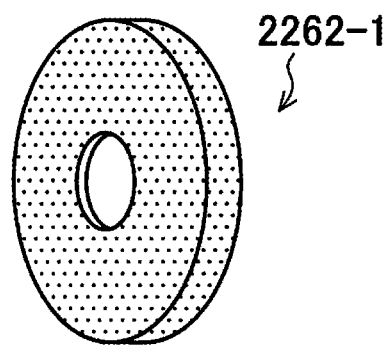
FIG. 18A is a perspective view showing the shape of a light-shielding mask 2262-1.
Figure 18B:
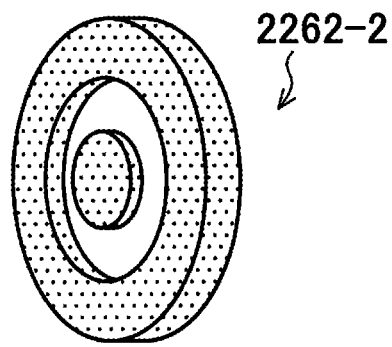
FIG. 18B is a perspective view showing the shape of a light-shielding mask 2262-2.
Figure 18C:
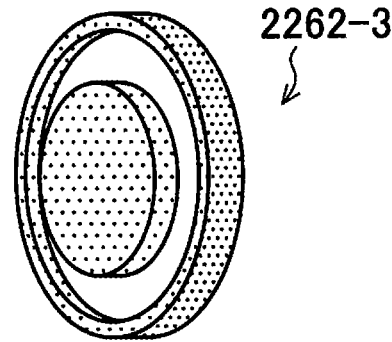
FIG. 18C is a perspective view showing the shape of a light-shielding mask 2262-3.

FIGS. 18A to 18C are perspective views showing the shape of a light-shielding mask 2262-1, a light-shielding mask 2262-2, and a light-shielding mask 2262-3 each formed on the light receiving surface of each of the light receiving element. An opening of the light-shielding mask 2262-1 has a shape similar to the pupil region 1322a so as to enable only a central portion of the light receiving element 162 to receive light beams. An opening of the light-shielding mask 2262-2 has also a shape similar to the pupil region 1322b so as to enable only a ring-shaped portion corresponding to a peripheral part of the opening of the light-shielding mask 2262-1 to receive light beams. Further, an opening of the light-shielding mask 2262-3 has a shape similar to the pupil region 1322c so as to enable only a ring-shaped portion corresponding to a peripheral part of the opening of the light-shielding mask 2262-2 to receive light beams.

Figure 19:
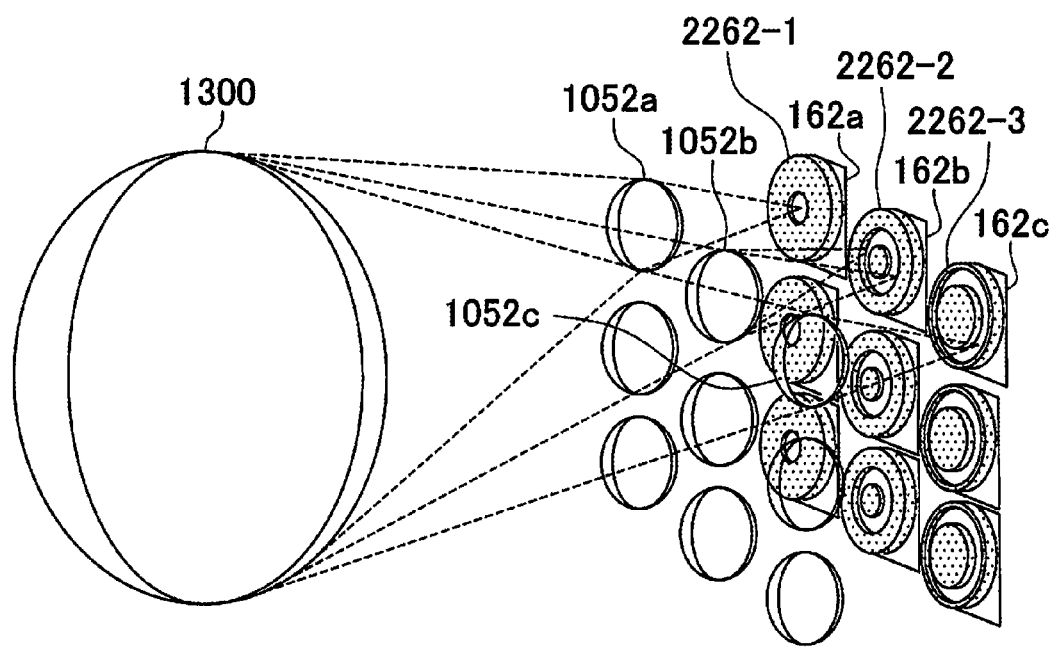
FIG. 19 is an overhead view schematically showing a lens system, microlenses, shielding elements, and light receiving elements.
Figure 20:
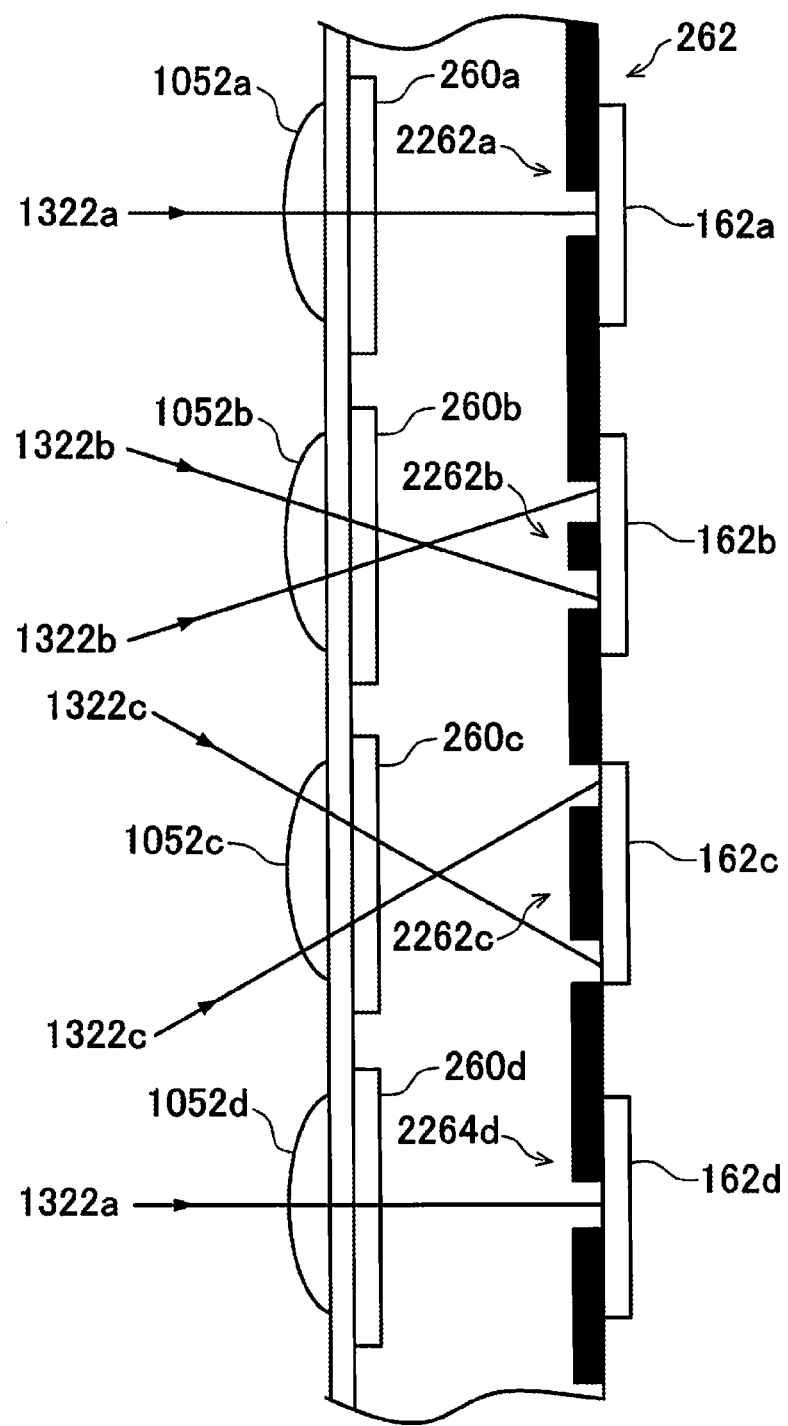
FIG. 20 is a view schematically showing one example of a light receiving unit.

FIG. 19 is an overhead view schematically showing a lens system 1300, each of microlenses 1052a-1052c, each of light-shielding masks 2262-1 to 2262-3, and each of light receiving elements 162a-162c. FIG. 20 is a cross sectional view schematically showing one example of a light receiving unit of this example.

In the light receiving unit 20 of this example, one light receiving element is provided corresponding to one microlens. In the example of FIG. 20, there are respectively provided a light receiving element 162a corresponding to the microlens 1052a, a light receiving element 162b corresponding to the microlens 1052b, a light receiving element 162c corresponding to the microlens 1052c, and a light receiving element 162d corresponding to the microlens 1052d. It is to be noted that the center position of each microlens 1052 and the center position of each light receiving element 162 are placed so as to be aligned.

Moreover, there are each correspondingly provide a light-shielding section 2262a on the light receiving surface of the light receiving element 162a, a light-shielding section 2262b on the light receiving surface of the light receiving element 162b, and a light-shielding section 2262c on the light receiving surface of the light receiving element 162c. In this case, the light-shielding section 2262a has the shape of the light-shielding mask 2262-1, the light-shielding section 2262b has the shape of the light-shielding mask 2262-2, and the light-shielding section 2262c has the shape of the light-shielding mask 2262-3.

Further on the light receiving surface of the light receiving element 162d, a light-shielding section 2262d is formed. The light-shielding section 2262d, like the light-shielding section 2262a, has the shape of the light-shielding mask 2262-1. Although omitted in the drawing, the light-shielding masks 2262-1 to 2262-3 are repeatedly placed on the light receiving surface of each of the light receiving elements 162 in accordance with a specified rule.

Light beams that passed through generally the entire surface of the exit pupil 1320 come incident into the respective microlenses 1052. In this case, light beams that passed through the microlens 1052a are limited only to those that passed through the pupil region 1322a by the light-shielding section 2262a having the shape of the light-shielding mask 2262-1, and so only the light beams that passed through the pupil region 1322a are received in the light receiving element 162a. Therefore, the light receiving element 162a receives only the object light beams with a focal length corresponding to the pupil region 1322a.

Similarly, out of the light beams that passed through the microlens 1052b, only the light beams that passed through the pupil region 1322b are received by the light receiving element 162b due to the presence of the light-shielding section 2262b having the shape of the light-shielding mask 2262-2. Out of the light beams that passed through the microlens 1052c, only the light beams that passed through the pupil region 1322c are received by the light receiving element 162c due to the presence of the light-shielding section 2262c having the shape of the light-shielding mask 2262-3. Therefore, only the object light beams with a focal length corresponding to the pupil region 1322b are received by the light receiving element 162b, while only the object light beams with a focal length corresponding to the pupil region 1322c are received by the light receiving element 162c.

Thus, a plurality of the light-shielding masks 2262 of the light-shielding section 262 are provided in the shapes similar to the pupil regions of the respective focal lengths, so that each of the object light beams that passed through predetermined pupil regions 122 is received by each of the corresponding light receiving elements 162. As a consequence, the image generation section 170 can obtain a long focal-length image, a middle focal-length image, and a short focal-length image from the imaging signals of the respective light receiving elements 162.

Further, it is also possible to limit the luminous flux incident into the light receiving sections 160 with use of the microlenses each different in focal length.

Figure 21:
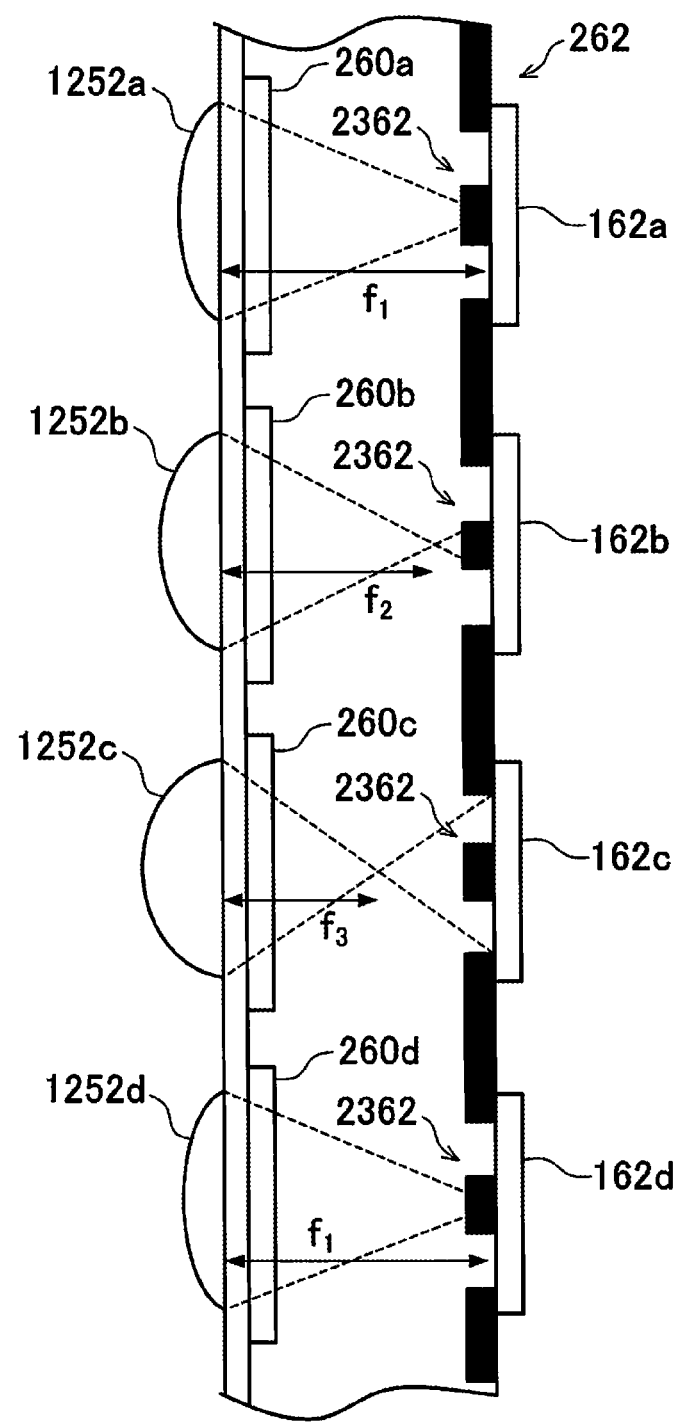
FIG. 21 is a view schematically showing one example of a light receiving unit.

FIG. 21 schematically shows one example of a light receiving unit of the present example. In the light receiving unit 20 of this example, one light receiving element is provided corresponding to one microlens. In the example of FIG. 21, there are respectively provided, a light receiving element 162a corresponding to a microlens 1252a, a light receiving element 162b corresponding to a microlens 1252b, a light receiving element 162c corresponding to a microlens 1252c and a light receiving element 162d corresponding to a microlens 1252d. It is to be noted that the center position of each microlens 1252 and the center position of each light receiving element 162 are arranged so as to be aligned.

Also on the light receiving surface of each light receiving element 162, a light-shielding section 2362 is formed. Like the light-shielding mask 2262-2 shown in FIG. 18B, the light-shielding section 2362 is made of a circular light-shielding mask and a ring-shaped light-shielding mask with a ring-shaped opening. The width of the opening may properly be determined so that luminous flux can appropriately be limited.

In this case, the respective microlenses 1252 have focal lengths different from each other. In the example of FIG. 21, the microlens 1252a has a first focal length $f_1$, and has a focal position on the light receiving surface of the light receiving element 162a. The microlens 1252b has a second focal length $f_2$ that is shorter than the first focal length $f_1$ and has a focal position on a near side (microlens side) of the light receiving surface of the light receiving element 162b. The microlens 1252c has a third focal length $f_3$ that is shorter than the second focal length $f_2$ and has a focal position on a further near side (microlens side) of the focal position of the microlens 1252b.

Further, the microlens 1252d is configured like the microlens 1252a. The microlens 1252d has the first focal length $f_1$. Although omitted in the drawing, the microlenses 1252 having the first focal length $f_1$, the second focal length $f_2$, and the third focal length $f_3$ are each repeatedly placed in accordance with a specified rule.

Figure 22A:
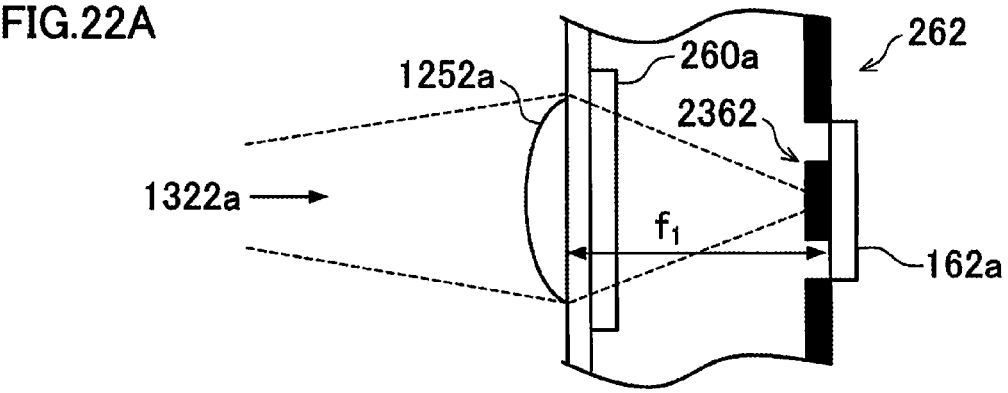
FIG. 22A is a view showing a relation between a light beam that passed through a pupil region 1322a and was incident into a microlens and a light beam to be received by light receiving elements.
Figure 22B:
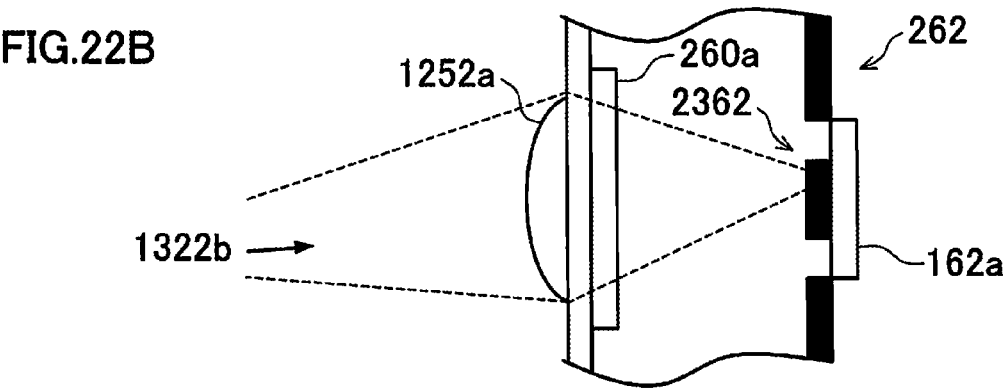
FIG. 22B is a view showing a relation between a light beam that passed through a pupil region 1322b and was incident into the microlens and a light beam to be received by the light receiving elements.
Figure 22C:
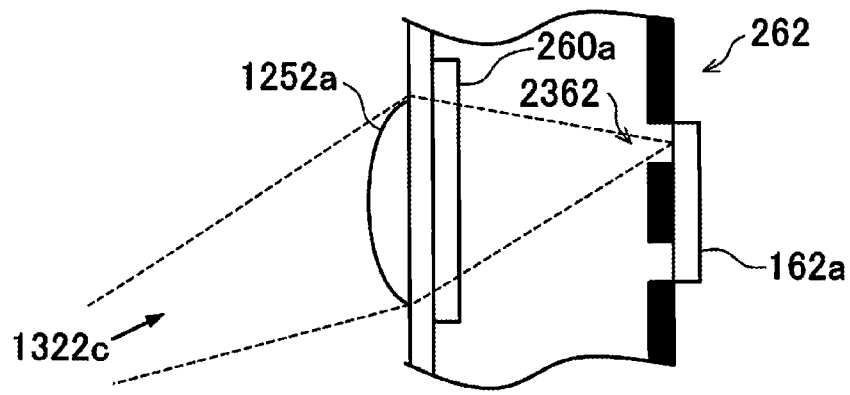
FIG. 22C is a view showing a relation between a light beam that passed through a pupil region 1322c and was incident into the microlens and a light beam to be received by the light receiving elements.

A description is now given of a relation between light beams that were incident into the respective microlenses 1252 and light beams to be received by corresponding light receiving elements 162. FIGS. 22A to 22C are views showing a relation between a light beam that was incident into the microlens 1252a having a first focal length $f_1$ and a light beam to be received by the light receiving element 162a.

Light beams that passed through generally the entire surface of the exit pupil 1320 come incident into the microlens 1252a. In this case, as shown in FIG. 22A, a light beam that passed through the pupil region 1322a in the exit pupil 1320 is limited by the circular light-shielding mask at the center of the light-shielding section 2362, so that the light beam does not come incident into the light receiving element 162a. Similarly, as shown in FIG. 22B, a light beam that passed through the pupil region 1322b in the exit pupil 1320 is also limited by the circular light-shielding mask at the center of the light-shielding section 2362, so that the light beam does not come incident into the light receiving element 162a.

On the contrary, a light beam that passed through the pupil region 1322c in the exit pupil 1320 comes incident into the light receiving element 162a through an opening of the light-shielding section 2362 as shown in FIG. 22C.

In this way, light beams that passed through the microlens 1252a are limited only to those that passed through the pupil region 1322a by the microlens 1252a and the light-shielding section 2362, and so only the light beams that passed through the pupil region 1322c are received by the light receiving element 162a. Therefore, the light receiving element 162a receives only the object light beams with a focal length corresponding to the pupil region 1322c.

Figure 23A:
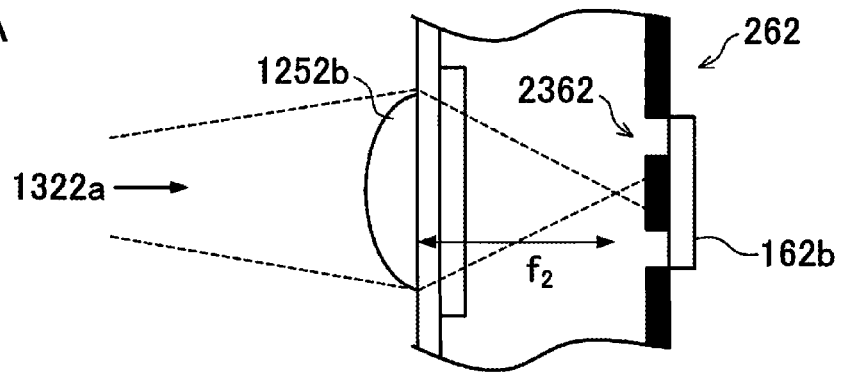
FIG. 23A is a view showing a relation between a light beam that passed through the pupil region 1322a and was incident into a microlens and a light beam to be received by light receiving elements.
Figure 23B:
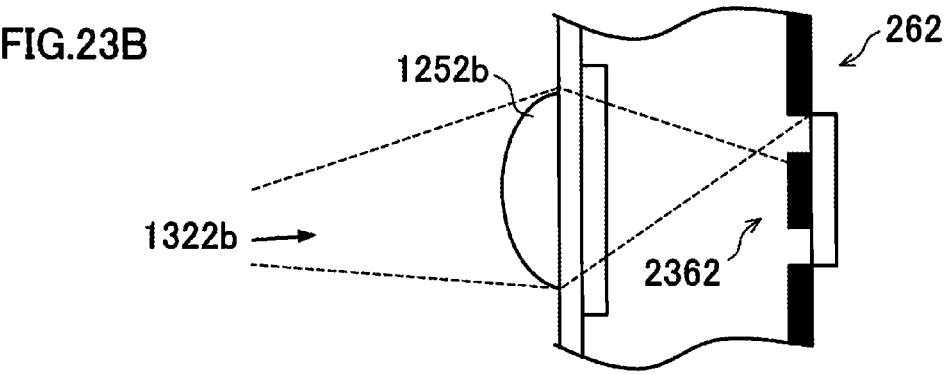
FIG. 23B is a view showing a relation between a light beam that passed through a pupil region 1322b and was incident into the microlens and the light beam to be received by the light receiving elements.
Figure 23C:
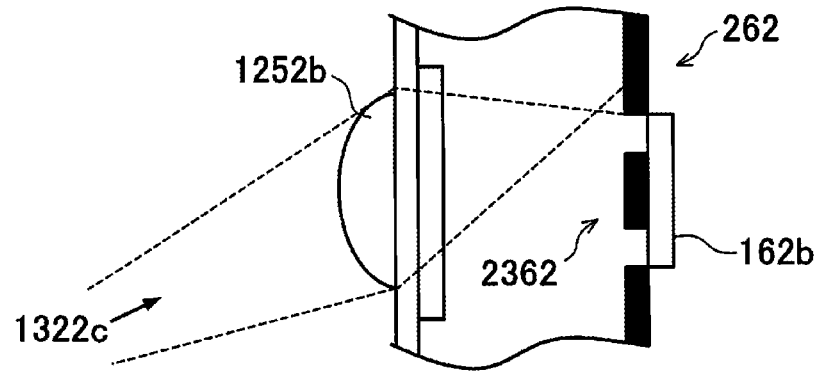
FIG. 23C is a view showing a relation between a light beam that passed through the pupil region 1322c and was incident into the microlens and a light beam to be received by the light receiving elements.

FIGS. 23A to 23C are views showing a relation between a light beam which was incident into the microlens 1252b having a second focal length $f_2$ and a light beam to be received by the light receiving element 162b.

Light beams that passed through generally the entire surface of the exit pupil 1320 come incident into the microlens 1252b. In this case, as shown in FIG. 23A, a light beam that passed through the pupil region 1322a in the exit pupil 1320 is limited by the circular light-shielding mask at the center of the light-shielding section 2362, so that the light beam does not come incident into the light receiving element 162b.

On the contrary, a light beam that passed through the pupil region 1322b in the exit pupil 1320 comes incident into the light receiving element 162b through an opening of the light-shielding section 2362 as shown in FIG. 23B.

Moreover as shown in FIG. 23C, a light beam that passed through the pupil region 1322c in the exit pupil 1320 is limited by the ring-shaped light-shielding mask of the light-shielding section 2362, so that the light beam does not come incident into the light receiving element 162b.

In this way, light beams that passed through the microlens 1252ba are limited only to those that passed through the pupil region 1322b by the microlens 1252b and the light-shielding section 2362, and so only the light beams that passed through the pupil region 1322b are received by the light receiving element 162b. Therefore, the light receiving element 162b receives only the object light beams with a focal length corresponding to the pupil region 1322b.

Figure 24A:
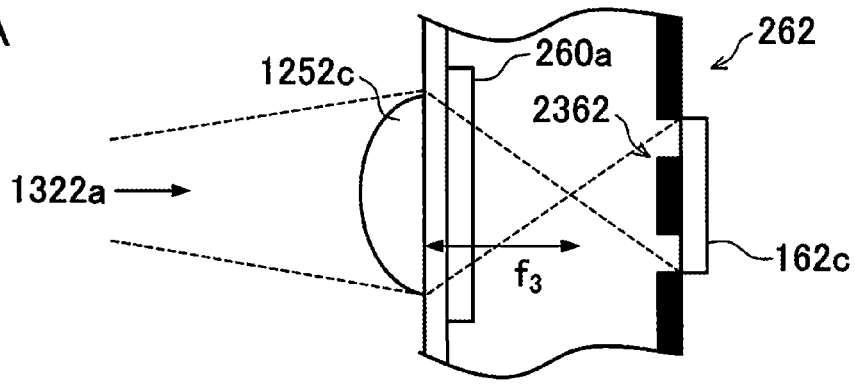
FIG. 24A is a view showing a relation between a light beam that passed through the pupil region 1322a and was incident into a microlens and a light beam to be received by light receiving elements.
Figure 24B:
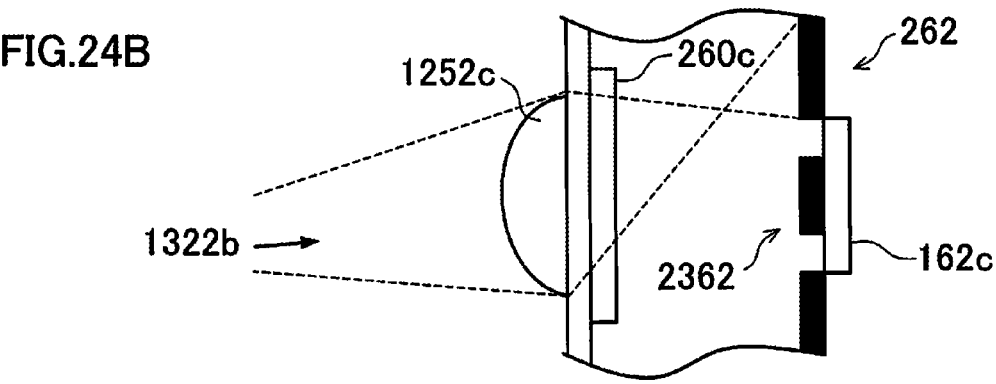
FIG. 24B is a view showing a relation between a light beam that passed through the pupil region 1322b and was incident into the microlens and a light beam to be received by the light receiving elements.
Figure 24C:
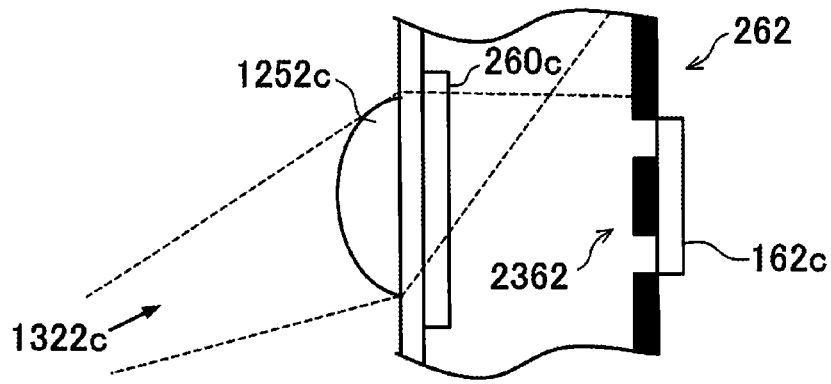
FIG. 24C is a view showing a relation between a light beam that passed through the pupil region 1322c and was incident into the microlens and a light beam to be received by the light receiving elements.

FIGS. 24A to 24C are views showing a relation between a light beam which was incident into the microlens 1252c having a third focal length $f_3$ and a light beam to be received by the light receiving element 162c.

Light beams that passed through generally the entire surface of the exit pupil 1320 come incident into the microlens 1252c. In this case, a light beam that passed through the pupil region 1322a in the exit pupil 1320 comes incident into the light receiving element 162c through an opening of the light-shielding section 2362 as shown in FIG. 24A.

On the contrary, as shown in FIG. 24B, a light beam that passed through the pupil region 1322b in the exit pupil 1320 is limited by the ring-shaped light-shielding mask of the light-shielding section 2362, so that the light beam does not come incident into the light receiving element 162c. Similarly, as shown in FIG. 24C, a light beam that passed through the pupil region 1322c in the exit pupil 1320 is limited by the ring-shaped light-shielding mask of the light-shielding section 2362, so that the light beam does not come incident into the light receiving element 162c.

In this way, light beams that passed through the microlens 1252c are limited only to those that passed through the pupil region 1322a by the microlens 1252c and the light-shielding section 2362, and so only the light beams that passed through the pupil region 1322a are received by the light receiving element 162c. Therefore, the light receiving element 162c receives only the object light beams with a focal length corresponding to the pupil region 1322a.

As described in the foregoing, focal lengths of the respective microlenses 1252 are set and the light-shielding section 2362 is placed so that the object light beams that passed through predetermined pupil regions 1322 are each received by corresponding light receiving elements 162. As a consequence, the image generation section 170 can obtain a long focal-length image, a middle focal-length image, and a short focal-length image from the imaging signals of the respective light receiving elements 162.

Thus, with the lens system 1300 of this example which has focal lengths different in every circular region and every ring-shaped region sectioned based on a distance from the center of the lens, focal lengths are different corresponding to a distance from the optical axis, which makes it possible to take images with different focal lengths.

While the lens system 1300 of this example has a short focal length at the center of the optical axis and has a longer focal length as going farther from the optical axis, the lens may have a long focal length at the center of the optical axis and have a shorter focal length as going farther from the optical axis on the contrary.

Further in FIGS. 1 through 17, a description has been given by taking up the lens system whose focal length is continuously varied, though a lens systems whose focal length is discontinuously varied (such as bifocal lenses and multifocal lenses whose refraction amount is varied in step) may be employed as a lens system of the imaging apparatus described with reference to FIGS. 1 through 17.

Figure 25A:
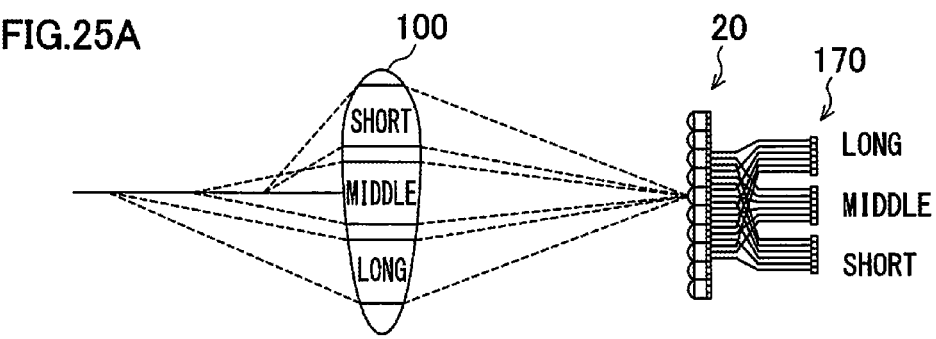
FIG. 25A is a view schematically showing a light beam, incident into an asymmetrical progressive refraction lens, being separated and extracted as an image signal.
Figure 25B:
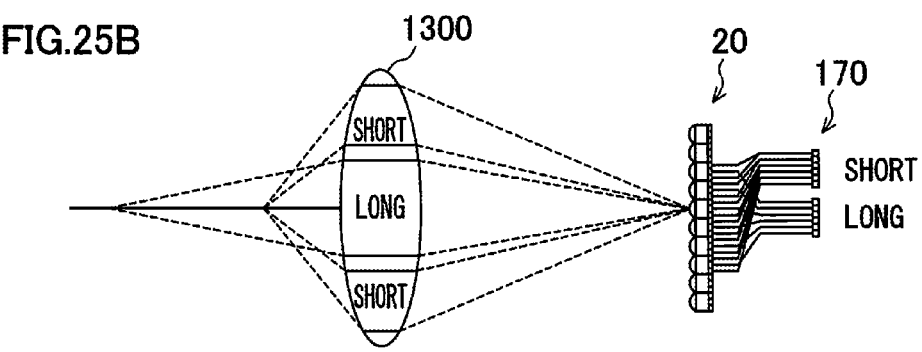
FIG. 25B is a view schematically showing a light beam, incident into a rotationally-symmetrical spherical aberration lens with a short focal length at the center of the optical axis, being separated and extracted as an image signal.
Figure 25C:
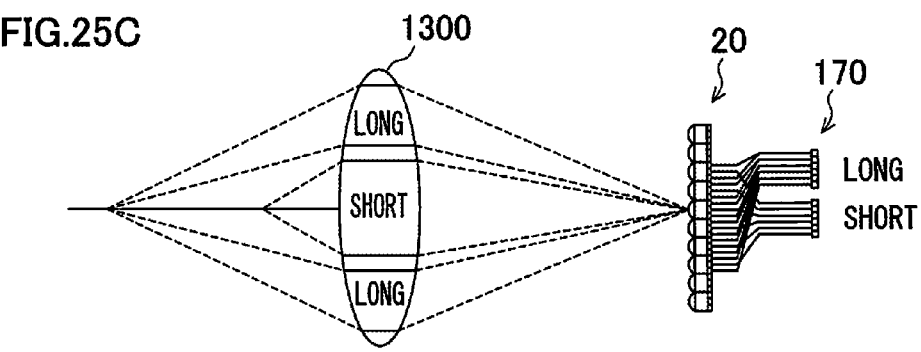
FIG. 25C is a view schematically showing a light beam, incident into a rotationally-symmetrical spherical aberration lens with a long focal length at the center of the optical axis, being separated and extracted as an image signal.

FIGS. 25A to 25C are views schematically showing light beams, incident into a lens, being separated and extracted as image signals, in which there are shown lenses 100 and 1300, a light receiving unit 20 that limits the luminous flux and receives a light beam according to every focal lengths, and an image generation section 170 capable of generating images with different focal lengths based on image signals of every focal length.

FIG. 25A shows the case of using an asymmetrical progressive refraction lens, FIG. 25B shows the case of using a rotationally symmetrical spherical aberration lens with a short focal length at the center of the optical axis, and FIG. 25C shows the case of using a rotationally symmetrical spherical aberration lens with a long focal length at the center of the optical axis.

<Image Processing Characteristic of Present Invention>

In the above-disclosed embodiment, each of the light receiving elements receives only the object light beams that passed through specific pupil regions of the image formation lens (i.e., the object light beams from the regions having specific focal lengths) with the functions of optical elements such as prism elements and shielding elements. However, depending on accuracy of finishing and control errors of these optical elements, object light beams that passed through pupil regions other than the assumed pupil regions may possibly come incident into the light receiving elements, and such incident light beams may serve as error components which cause image quality degradation, such as blur degradation and contrast degradation.

Moreover, the light receiving elements having directivity to each region of a plurality of pupil regions are arrayed on one side. Accordingly, when attention is paid to light receiving elements corresponding to a specific pupil region, missing data occurs in the pixels that include light receiving elements corresponding to other pupil regions.

Accordingly, a description is hereinafter given of image processing as a solution to these problems. It is to be noted that such image processing can be performed in the image generation section 170.

<Image Processing No. 1: Correcting Image Blurring>

As described in the foregoing, when the light receiving elements, which receive an object light beam coming from a specific pupil region of an image formation lens (i.e., an object light beams of a specific focal length), receive object light beams from other pupil regions (i.e., object light beams of other focal lengths), the object light beams coming from the other pupil regions turn into blurring components, which generate a blurred image (large point image). As a solution to such a blurred image, filtering processing with use of restoration filters may be performed as described below, so that the image can be restored to a high-resolution image (small point image).

For example, restoration processing is performed by storing in advance 7×7 kernel-size restoration gain data in the imaging apparatus (e.g., a memory in the image generation section 170), and by executing deconvolution processing (inverse convolution operation processing) between 7×7-pixel color signals, which are pre-restoration R, G and B color signals outputted from an AD converting section of an image sensor and which mainly consist of target pixel color signals that are processing targets and color signals of pixels having the same colors within a specified region centering around the target pixels, and the stored 7×7 kernel-size restoration gain data, and the post-restoration color signals are outputted in place of the pre-restoration target pixel color signals.

As shown in FIG. 26A, a point image (optical image) that transmitted a photographic lens is formed on the image sensor as a large point image (blurred image) due to a signal from a pupil region, other than the specific pupil region (signal from a pupil region with a different focal length), being mixed therein. However, the large point image is restored to a small point image (high-resolution image) as shown in FIG. 26B by the deconvolution processing.

<Method for Generating Restoration Gain Data>

A description is now given of a method for generating restoration gain data for use in the deconvolution processing.

Figure 27:
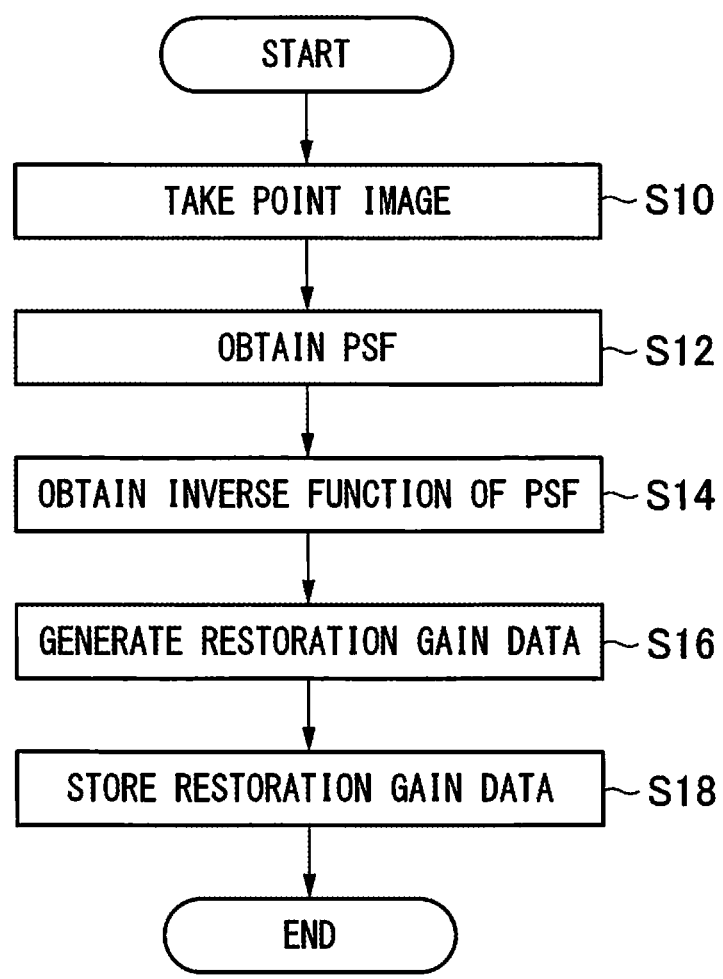
FIG. 27 is a flow chart showing an embodiment of a method for generating restoration gain data.

FIG. 27 is a flow chart showing an embodiment of the method for generating restoration gain data according to the present invention.

First, in order to measure a point spread function (PSF) of a photographic lens of the imaging apparatus at the time of imaging apparatus adjustment such as pre-shipment adjustment, a point image (point light source) is taken with the photographic lens to acquire a blurred image (Step S10).

Next, with the image acquired by taking a point image being $g(x, y)$, an original point image being $f(x, y)$ and a point spread function (PSF) being $h(x, y)$, a blurred image $g(x, y)$ may be expressed by the following formula:

$$g(x,y)=h(x,y)*f(x,y) \qquad \text{[Formula 1]}$$

where * denotes convolution.

Based on the blurred image $g(x,y)$ acquired by imaging of the point image in Step S10, a value $h(x,y)$ (that is, point spread function (PSF)) in [Formula 1] is obtained (Step S12).

Next, an inverse function of the obtained point spread function (PSF) is obtained (Step S14). When the inverse function is defined as $R(x,y)$, a restored image corresponding to the original image $f(x,y)$ is obtained by performing convolution processing of the blurred image $g(x,y)$ with use of $R(x,y)$ as shown in the following formula:

$$g(x,y)*R(x,y)=f(x,y) \qquad \text{[Formula 2]}$$

In the above, $R(x,y)$ represents a restoration filter. The restoration filter is structured from, for example, 7×7 filter values (restoration gain data) as mentioned above, and this restoration gain data is generated in Step S16. As this kind of restoration filters, a least square filter (winner filter) that minimizes mean square error between the original image and the restored image, a constrained deconvolution filter, a recursive filter, a homomorphic filter, or the like can be used. The restoration processing is disclosed, for example, in NPL 1 and NPL 2 (see PTL 5).

The restoration gain data generated in Step S16 is stored in a memory in the imaging apparatus (Step S18).

<Image Processing No. 2: Correcting Contrast>

When the light receiving elements, which receive object light beams from a specific pupil region of an image formation lens, receive an object light beam incident from another pupil region as in the case of the above-described image blurring, a difference between brightness and darkness in an image is obscured due to the object light beam from the another pupil region, which causes deterioration of contrast. Such deterioration of contrast may be corrected as shown below.

As described above, since a low-contrast image is in the state of having a smaller difference between brightness and darkness, a difference between a bright portion and a dark portion should be enhanced, for example, by the following image processing.

First, RGB signals are converted to YCrCb signals, and after information on the difference between brightness and darkness is obtained, the Y signal is subjected to processing. More specifically, a value of the Y signal is magnified at a fixed ratio, so that a distribution or a brightness difference of the Y signal can be magnified. For example, when the value of the Y signal is expressed with 8 bits (0-255), a value of the difference between brightness and darkness is 60 supposing that an original Y signal is distributed in the range of (96-156). If the value of the Y signal is doubled, the distribution range becomes (192-312), so that a value of the difference between brightness and darkness is 120, which is twice as large as the original range.

However, in this case, since an upper limit of brightness distribution exceeds 255, signals are saturated so that blown out highlights are generated. At the same time, since the range of 192 or below is not in use by the Y signal, this approach is not efficient from a viewpoint of increasing contrast. Therefore, signal conversion is preferably performed so that the signal is distributed in the range of (0-255) after processing.

There are various methods for such conversion, one of which uses, for example, a linear expression for conversion as shown below.

$$Y' = Y * [255/(MAX-MIN)] - MIN \qquad \text{[Formula 3]}$$

where Y represents a value of Y signal before conversion, Y' represents a value of Y signal after conversion MIN represents a minimum value of Y signal before conversion and MAX represents a maximum value of Y signal after conversion.

<Image Processing No. 3: Enhancing Edges>

As a solution to image quality degradation caused by the case where light receiving elements, which receive object light beams from a specific pupil region of an image formation lens, receive object light beams incident from other pupil regions, edge enhancement may be performed as shown below. Here, various edge enhancement methods are conventionally present, and in a method where edge enhancement is uniformly applied to the entire screen, detected faces, major objects and the like, edge enhancement may possibly be applied to a background even when, for example, a major object is in focus and the background is not in focus, as a result of which edges of blurred portions may be enhanced and a desired image may not be obtained. In view of such cases, it is preferable to perform edge enhancement in consideration of an object distance. More specifically, a method described in PTL 6 can be used.

One aspect of an image processing apparatus described in the above gazette includes: an input section adapted to input image data obtained by photoelectrically converting an object, which was imaged via an imaging lens, with an image sensor; a distance calculation section adapted to calculate a distance to the object; and an edge enhancement processing section adapted to apply edge enhancement processing, with strength corresponding to the distance calculated by the distance calculation section, to the image data inputted by the input section.

In the image processing apparatus of the above aspect, based on information on main phase difference in a specified focus region, main distance information indicating a distance to an object in the specified focus region and distance information indicating a distance to an object in a peripheral region are acquired, and based on such information, a distance difference between a focus object that is an object within the specified focus region and a peripheral object which is an object in each peripheral region is calculated for every peripheral region. When the distance difference is less than a specified threshold, an edge component strength indicated by edge component data on a specified focus region and an edge component strength indicated by edge component data on a peripheral region where the distance difference is less than a threshold are converted based on first conversion characteristic information, and edge enhancement is applied to these regions.

Contrary to this, when the distance difference is a specified threshold or more, an edge component strength indicated by edge component data on the peripheral region where the distance difference is a specified threshold or more is converted based on second conversion characteristic information, and edge enhancement is applied thereto.

Such processing is performed in the image processing apparatus of the above configuration in order to change the degree of edge enhancement based on the difference between a distance to a focus object within a specified focus region and a distance to an object in each peripheral region other than the specified focus region, which makes it possible to prevent excessive edge enhancement from being applied to out-of-focus objects and to thereby obtain natural images.

In the present embodiment, when the object light beams that passed through regions other than the specific pupil region of an image formation lens come incident into the light receiving elements due to problems in accuracy of finishing and the like, the major object being in focus and the background being out of focus as described above may occur. However, using the above method in such a case makes it possible to obtain natural images with edge enhancement being appropriately applied.

<Image Processing No. 4: Interpolating Missing Data>

For interpolation of missing data, a description is hereinbelow given of an example of the case where an image formation lens has three regions including a short focus region, a middle focus region and a long focus region, and light receiving elements 162a, 162b, and 162c configured to receive object light beams from any one of these three regions are arrayed every three columns as shown in FIG. 19.

In this case, when attention is paid to, for example, the light receiving element 162a, data of the columns where the light receiving elements 162b and 162c are present is missing. Accordingly, as for the data of the light receiving element 162a in the column where the light receiving element 162b is present, two columns of data of the light receiving element 162a may be used and a weight corresponding to a distance from the column that is an interpolation target may be added for calculation. Interpolation may be performed by weighing with such a ratio that data of the light receiving element 162a in the column which is on the left side of the column of the light receiving element 162b in FIG. 19 is given a weight of 1, and data of the light receiving element 162a in the column (unshown) which is on the right side of the light receiving element 162c is given a weight of (½), or interpolation may also be performed by similarly weighing with use of four columns of data of the light receiving element 162a.

The data of the light receiving element 162a in the column where the light receiving element 162c is present may also be obtained by interpolation in a similar manner. It is to be noted that the number of columns and the weighing configuration for use in interpolation is not limited to those described in the foregoing, but may properly be selected.

Although the present invention has been described with use of embodiments, the technical scope of the present invention is not limited to the range described in the embodiments. It is apparent for those skilled in the art that various arrangements or modifications can be applied to the disclosed embodiments. It is clear from the description of the claims that configurations incorporating such arrangements and modifications shall also be incorporated in the technical scope of the present invention.

It should be noted that the execution sequence of each processing such as operations, procedures, steps and phases in the apparatus, system program and method shown in the claims, specification, and drawings is not specifically clarified with such phrases as "prior to" and "before", and that unless an output of the prior processing is used in the subsequent processing, they can be executed in an arbitrary sequence. Even though the operation flows in the claims, specification and drawings are described by using such phrases as "first" and "next" for the sake of convenience, it does not mean that the operation flows should be executed in this order.

REFERENCE SIGNS LIST 10, 1010, 1110 Imaging apparatus, 20 Light receiving unit, 100, 1300 Lens system, 110, 1310 Lens, 115 Optical device, 120, 1220, 1320 Exit pupil, 122 Pupil region, 130 Object light beam, 140 Deflection section, 142 Prism element, 150 Microlens section, 152, 952, 1052, 1252 Microlens, 160 Light receiving section, 162, 1162-1, 2, 3 Light receiving element, 170 Image generation section, 180 Control section, 190 Image recording section, 200 Housing, 210, 220, 230 Fluid region, 240, 640 Divider section, 242 Divider plate, 250 Through hole, 252, 254, 642, 644 Lateral surface portion, 260 color filter, 262 Light-shielding section, 264, 1264 Opening, 281, 282, 680 Prism element, 290, 291, 292 Driving section, 280 Elastic surface, 350 Row direction, 360 Column direction, 400 Image surface, 510 Short focus image, 520 Middle focus image, 530 Long focus image, 550 Synthesized image, 512, 522, 532, 552 Short-distance object image, 514, 524, 534, 554 Middle-distance object image, 516, 526, 536, 556 Long-distance object image, 700, 701, 702, 703, 704 Protruding portion, 1060, 1070 Light-shielding section, 1062, 1072 Opening, 1130, 1140 Polarizing filter section, 1132 First polarizing filter, 1134 Second polarizing filter, 1142 Polarizing filter, 1162 Light receiving element group, 1232 First polarizing filter, 1234 Second polarizing filter, 1230 Polarizing filter section, 1322 Partial pupil region, 2262, 2263 Light-shielding section

The invention claimed is:

1. An imaging apparatus, comprising:
an image formation lens having focal lengths different in every region;
a light receiving section having a plurality of light receiving elements;
a plurality of optical elements respectively provided corresponding to a plurality of the light receiving elements to make the corresponding light receiving elements receive an object light beam that passed through predetermined pupil regions in an exit pupil of the image formation lens; and
an image generation section adapted to generate an image of an object from imaging signals of a plurality of the light receiving elements, wherein
a plurality of first optical elements out of the plurality of the optical elements make an object light beam, which passes through a region having a first focal length of the image formation lens and a first pupil region in the exit pupil, incident into the corresponding light receiving elements,
a plurality of second optical elements out of the plurality of the optical elements make an object light beam, which passes through a region having a second focal length of the image formation lens and a second pupil region in the exit pupil, incident into the corresponding light receiving elements, and
the image generation section selects, for generation of the image of the object, any one of the pupil regions in the exit pupil through which a light beam passes and generates the image of the object with use of imaging signals of a plurality of the light receiving elements that receive an object light beam that passed through the selected pupil region.

2. The imaging apparatus according to claim 1, wherein
in the case of selecting, for generation of the image of the object, any one of the pupil regions in the exit pupil through which an object light beam passes, the image generation section selects, based on an object distance and focal lengths each corresponding to a plurality of the pupil regions of the exit pupil, at least one of the pupil regions through which an object light beam that forms an image at a position of the light receiving section passes.

3. The imaging apparatus according to claim 2, wherein
the image generation section selects, based on a range of the object distance and focal lengths each corresponding to a plurality of the pupil regions of the exit pupil, a plurality of the pupil regions through which the object light beam that forms an image at the position of the light receiving section passes.

4. The imaging apparatus according to claim 1, wherein
the plurality of the optical elements are respectively prism elements that make the corresponding light receiving elements receive an object light beam that passed through the predetermined pupil regions.

5. The imaging apparatus according to claim 2, wherein
the plurality of the optical elements are respectively prism elements that make the corresponding light receiving elements receive an object light beam that passed through the predetermined pupil regions.

6. The imaging apparatus according to claim 3, wherein
the plurality of the optical elements are respectively prism elements that make the corresponding light receiving elements receive an object light beam that passed through the predetermined pupil regions.

7. The imaging apparatus according to claim 4, wherein
the prism elements are fluid prism elements having a prism interface formed from a fluid interface between a first fluid and a second fluid which are different in refractivity from each other, and
the imaging apparatus further comprises
a control section adapted to control an inclination of the prism interface with respect to an optical axis of the image formation lens so as to control a direction of luminous flux to be received by the light receiving elements each corresponding to a plurality of the prism elements.

8. The imaging apparatus according to claim 5, wherein
the prism elements are fluid prism elements having a prism interface formed from a fluid interface between a first fluid and a second fluid which are different in refractivity from each other, and the imaging apparatus further comprises a control section adapted to control an inclination of the prism interface with respect to an optical axis of the image formation lens so as to control a direction of luminous flux to be received by the light receiving elements each corresponding to a plurality of the prism elements.

9. The imaging apparatus according to claim 6, wherein the prism elements are fluid prism elements having a prism interface formed from a fluid interface between a first fluid and a second fluid which are different in refractivity from each other, and the imaging apparatus further comprises a control section adapted to control an inclination of the prism interface with respect to an optical axis of the image formation lens so as to control a direction of luminous flux to be received by the light receiving elements each corresponding to a plurality of the prism elements.

10. The imaging apparatus according to claim 7, wherein the control section controls the inclination of the prism interface based on the object distance so as to direct the direction of the luminous flux to be received by the corresponding light receiving elements toward the pupil region through which an object light beam that forms an image at the position of the light receiving section passes.

11. The imaging apparatus according to claim 8, wherein the control section controls the inclination of the prism interface based on the object distance so as to direct the direction of the luminous flux to be received by the corresponding light receiving elements toward the pupil region through which an object light beam that forms an image at the position of the light receiving section passes.

12. The imaging apparatus according to claim 9, wherein the control section controls the inclination of the prism interface based on the object distance so as to direct the direction of the luminous flux to be received by the corresponding light receiving elements toward the pupil region through which an object light beam that forms an image at the position of the light receiving section passes.

13. The imaging apparatus according to claim 7, further comprising:

a prism housing adapted to hold the first fluid and the second fluid; and a divider plate adapted to divide an inside of the prism housing, along the optical axis, into a first region filled with the first fluid and a second region filled with the second fluid, wherein the divider plate has a plurality of through holes formed corresponding to positions at which a plurality of the fluid prism elements are formed, and the control section controls the inclination of the prism interface with respect to the optical axis by controlling a position of the fluid interface in respective first lateral surface portions of a plurality of the through holes and a position of the fluid interface in second lateral surface portions opposite to the first lateral surface portions.

14. The imaging apparatus according to claim 8, further comprising:

a prism housing adapted to hold the first fluid and the second fluid; and a divider plate adapted to divide an inside of the prism housing, along the optical axis, into a first region filled with the first fluid and a second region filled with the second fluid, wherein the divider plate has a plurality of through holes formed corresponding to positions at which a plurality of the fluid prism elements are formed, and the control section controls the inclination of the prism interface with respect to the optical axis by controlling a position of the fluid interface in respective first lateral surface portions of a plurality of the through holes and a position of the fluid interface in second lateral surface portions opposite to the first lateral surface portions.

15. The imaging apparatus according to claim 9, further comprising:

a prism housing adapted to hold the first fluid and the second fluid; and a divider plate adapted to divide an inside of the prism housing, along the optical axis, into a first region filled with the first fluid and a second region filled with the second fluid, wherein the divider plate has a plurality of through holes formed corresponding to positions at which a plurality of the fluid prism elements are formed, and the control section controls the inclination of the prism interface with respect to the optical axis by controlling a position of the fluid interface in respective first lateral surface portions of a plurality of the through holes and a position of the fluid interface in second lateral surface portions opposite to the first lateral surface portions.

16. The imaging apparatus according to claim 10, further comprising:

a prism housing adapted to hold the first fluid and the second fluid; and a divider plate adapted to divide an inside of the prism housing, along the optical axis, into a first region filled with the first fluid and a second region filled with the second fluid, wherein the divider plate has a plurality of through holes formed corresponding to positions at which a plurality of the fluid prism elements are formed, and the control section controls the inclination of the prism interface with respect to the optical axis by controlling a position of the fluid interface in respective first lateral surface portions of a plurality of the through holes and a position of the fluid interface in second lateral surface portions opposite to the first lateral surface portions.

17. The imaging apparatus according to claim 11, further comprising:

a prism housing adapted to hold the first fluid and the second fluid; and a divider plate adapted to divide an inside of the prism housing, along the optical axis, into a first region filled with the first fluid and a second region filled with the second fluid, wherein the divider plate has a plurality of through holes formed corresponding to positions at which a plurality of the fluid prism elements are formed, and the control section controls the inclination of the prism interface with respect to the optical axis by controlling a position of the fluid interface in respective first lateral surface portions of a plurality of the through holes and a position of the fluid interface in second lateral surface portions opposite to the first lateral surface portions.

18. The imaging apparatus according to claim 12, further comprising:
- a prism housing adapted to hold the first fluid and the second fluid; and
- a divider plate adapted to divide an inside of the prism housing, along the optical axis, into a first region filled with the first fluid and a second region filled with the second fluid, wherein
- the divider plate has a plurality of through holes formed corresponding to positions at which a plurality of the fluid prism elements are formed, and
- the control section controls the inclination of the prism interface with respect to the optical axis by controlling a position of the fluid interface in respective first lateral surface portions of a plurality of the through holes and a position of the fluid interface in second lateral surface portions opposite to the first lateral surface portions.

* * * * *